US011128686B2

(12) United States Patent
Mitic et al.

(10) Patent No.: US 11,128,686 B2
(45) Date of Patent: Sep. 21, 2021

(54) CLOUD-BASED PRESET FOR MEDIA CONTENT PLAYBACK

(71) Applicant: Spotify AB, Stockholm (SE)

(72) Inventors: Richard Mitic, Stockholm (SE); Horia Jurcut, Stockholm (SE); Daniel Bromand, Stockholm (SE); David Gustafsson, Stockholm (SE)

(73) Assignee: Spotify AB, Stockholm (SE)

( * ) Notice: Subject to any disclaimer, the term of this patent is extended or adjusted under 35 U.S.C. 154(b) by 210 days.

(21) Appl. No.: 15/972,745

(22) Filed: May 7, 2018

(65) Prior Publication Data

US 2019/0342357 A1 Nov. 7, 2019

(51) Int. Cl.
*G06F 15/177* (2006.01)
*H04L 29/06* (2006.01)
*H04L 29/08* (2006.01)

(52) U.S. Cl.
CPC .......... *H04L 65/60* (2013.01); *H04L 67/1097* (2013.01)

(58) Field of Classification Search
CPC ............................ H04L 65/60; H04L 67/1097
USPC ....................................................... 709/217
See application file for complete search history.

(56) References Cited

U.S. PATENT DOCUMENTS

| | | |
|---|---|---|
| 2002/0046084 A1 | 4/2002 | Steele et al. |
| 2010/0106852 A1 | 4/2010 | Kindig et al. |
| 2014/0074959 A1* | 3/2014 | Alsina ................. H04N 21/458 709/213 |
| 2014/0123006 A1 | 5/2014 | Chen et al. |
| 2014/0277639 A1 | 9/2014 | Gomes-Casseres et al. |
| 2014/0317242 A1 | 10/2014 | Koo et al. |
| 2015/0220223 A1 | 8/2015 | Michalski et al. |
| 2016/0378429 A1* | 12/2016 | Dolecki ................. G08C 17/02 700/94 |
| 2017/0280189 A1* | 9/2017 | Ye .......................... G06F 3/0488 |
| 2018/0020268 A1* | 1/2018 | Denoual ............ H04N 21/4728 |
| 2018/0084363 A1* | 3/2018 | Kadri ...................... H04S 7/301 |
| 2018/0219750 A1* | 8/2018 | Usui ...................... H04L 43/04 |
| 2018/0307460 A1* | 10/2018 | Barton .................... G06F 3/165 |

\* cited by examiner

*Primary Examiner* — Alan S Chou
(74) *Attorney, Agent, or Firm* — Merchant & Gould P.C.

(57) ABSTRACT

A system is provided for streaming media content in a vehicle. The system includes a personal media streaming appliance system configured to connect to a media delivery system and receive media content from the media delivery system at least via a cellular network. The personal media streaming appliance system includes one or more preset buttons for playing media content associated with the preset buttons. Data about the preset buttons and the media content associated with the preset buttons can be stored in the media delivery system.

15 Claims, 15 Drawing Sheets

CLOUD-BASED PRESET FOR MEDIA CONTENT PLAYBACK

BACKGROUND

Many people enjoy consuming media content while traveling or during other activities. For example, many drivers and passengers listen to audio content, such as songs, albums, podcasts, audiobooks, and other types of audible content, in vehicles. Various media playback devices can be used to provide such audible content in vehicles. For example, typical sources of such audio content in vehicles include radios and fixed media players, such as devices that can play media content from CDs, USB drives, or SD cards. Alternatively, mobile devices, such as mobile phones or tablets running audio streaming applications, can be used to offer a personalized and flexible music-consuming experience using large catalogs of media content available from a media content server.

Some media playback devices provide preset buttons for playing media content. When a user selects a preset button on a media playback device, the media playback device operates to play particular media content assigned to the selected preset button. Preset buttons on the media playback devices can provide a convenient, simple way to play media content in a vehicle environment which would typically require enhanced focus on other activities such as driving or navigating.

There exists a need for a media playback system that provides preset buttons that are easy to use and control for media content playback while providing personalized user experience of consuming media content in a vehicle.

SUMMARY

In general terms, the present disclosure relates to a cloud-based preset system for media content playback. In one possible configuration and by non-limiting example, the system includes a media delivery system that stores data about presets of a media playback device and operates to share the data with other media playback devices. Various aspects are described in this disclosure, which include, but are not limited to, the following aspects.

One aspect is a method for playing media content. The method may include receiving a first preset signal associated with a preset signal source of a first media playback device; identifying a media context associated with the preset signal source based on the first preset signal; transmitting the media context to the first media playback device for playback; and storing media playback state information associated with the media context.

In certain examples, the media playback state information may include current position-in-track information that indicates a current playback position of the media context.

In certain examples, the media playback state information may include at least one of current context information, current track information, playback control status, playback settings, subsequent track information, and playback history information.

In certain examples, the method may include storing cloud preset data; the cloud preset data including the media playback state information.

In certain examples, the preset signal source may be a preset button provided in the first media playback device.

In certain examples, the first preset signal may include at least one of a user account identifier and a device identifier. The user account identifier may identify a user account associated with the first media playback device. The device identifier may identify the first media playback device.

In certain examples, the media context may include at least one of an album, a playlist, and a media content item.

In certain examples, the method may include receiving a second preset signal from the preset signal source of the first media playback device; and updating the media playback state information associated with the media context in response to the second preset signal.

In certain examples, the first preset signal may include a request for playing the media context. The second preset signal may include a request for stopping playback of the media context.

In certain examples, the method may include receiving a request for the media context from a second media playback device; identifying the media playback state information associated with the media context; and transmitting the media context to the second media playback device based on the media playback state information.

Another aspect is a media delivery system for providing media content to a media playback device. The media delivery system may include at least one processing device, at least one data storage device, and data instructions. The storage device may store a cloud preset data including information about a preset button of the media playback device and a media context associated with the preset button. The data instructions may be executable by the at least one processing device to cause the media delivery system to receive a first preset signal from the media playback device. The first preset signal may be associated with the preset button of the media playback device. The data instructions may further cause the media delivery system to retrieve the cloud preset data to identify the media context associated with the preset button based on the first preset signal. The data instructions may further cause the media delivery system to transmit the media context to the media playback device for playback. The data instructions may further cause the media delivery system to update the cloud preset data based on the transmission of the media context.

In certain examples, the cloud preset data may include media playback state information about the media context.

In certain examples, the data instructions may further cause the media delivery system to receive a second preset signal from the media playback device, and update the cloud preset data in response to the second preset signal. The second preset signal may be associated with the preset button of the media playback device.

In certain examples, the first preset signal may include a request for playing the media context, and the second preset signal may include a request for stopping playback of the media context.

In certain examples, the data instructions may further cause the media delivery system to receive a request for the media context from another media playback device, identify the cloud preset data associated with the media context; and transmit the media context to the other media playback device based on the cloud preset data.

DETAILED DESCRIPTION

Figure 1:
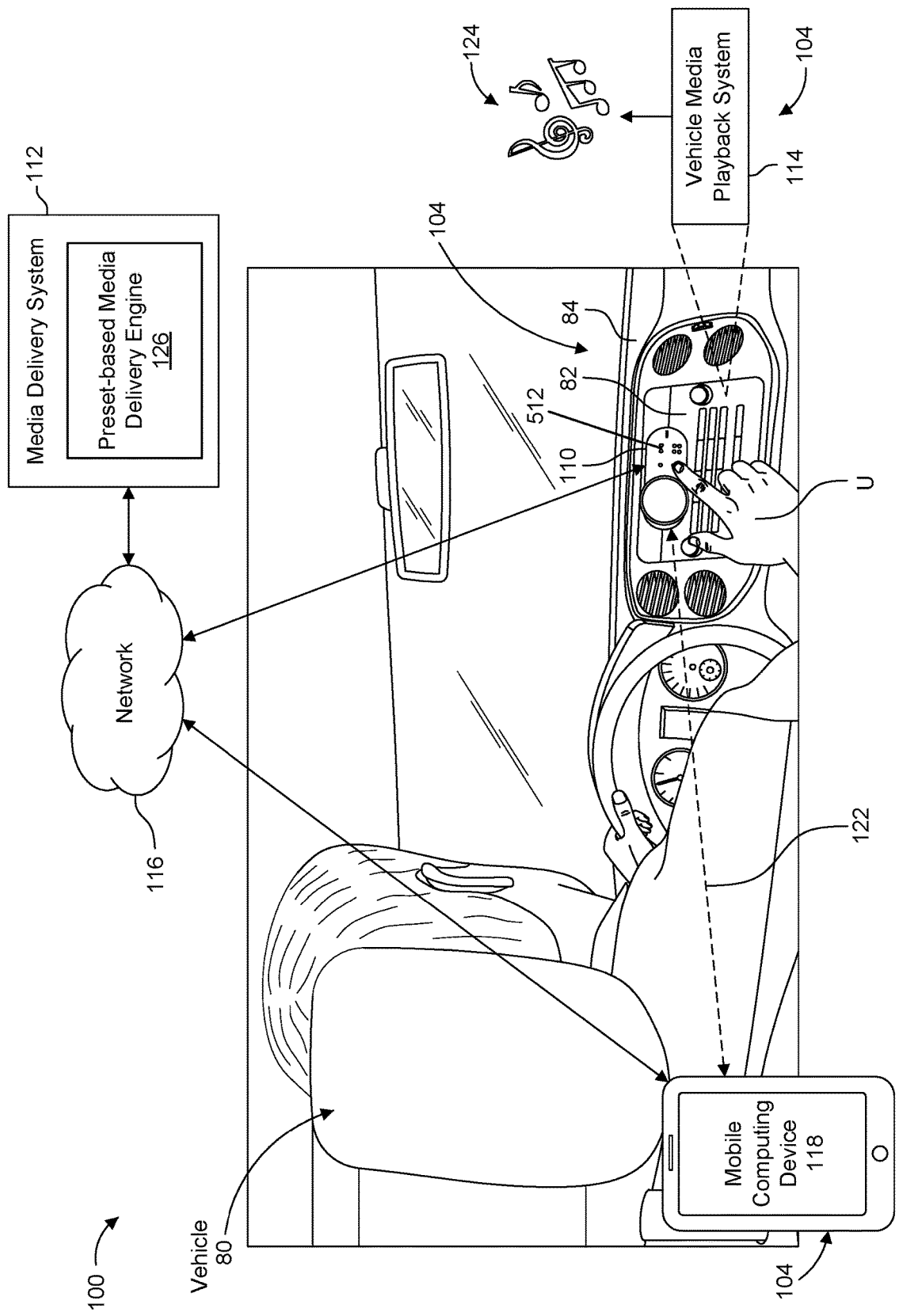
FIG. 1 illustrates an example system for streaming media content for playback.

Various embodiments will be described in detail with reference to the drawings, wherein like reference numerals represent like parts and assemblies throughout the several views.

People spend a significant amount of time traveling in vehicles. Many of them find that time to be more enjoyable when they are listening to music, watching videos, or otherwise consuming media content. Media content includes audio and video content. Examples of audio content include songs, albums, playlists, radio stations, podcasts, audio-books, and other audible media content items. Examples of video content include movies, music videos, television programs, and other visible media content items. In many cases, video content also includes audio content. As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, motorcycles), rail vehicles (e.g., trains, trams), tracked vehicles, watercraft (e.g., ships, boats), aircraft, human-powered vehicles (e.g., bicycles), wagons, and other transportation means. A user can drive a vehicle or ride in it, as a passenger, for traveling. As used herein, the term "travel" and variants thereof refers to any activity in which a user is in transit between two locations.

Consuming media content in a vehicle presents many challenges. In general, a user in a moving vehicle may have limited attention available for interacting with a media playback device due to the need to concentrate on travel related activities, such as driving and navigation. Therefore, while a vehicle is moving, it can be difficult for a user in the vehicle to interact with a media playback device without disrupting the driving or navigation. Further, the user interface of a media playback device can be overly complex, or may require such fine motor skills that it can be difficult to use while traveling in a vehicle. Voice-based user interfaces also encounter significant challenges to use in a vehicle environment. The passenger areas of a vehicle are often noisy due to engine noise, road noise, wind and weather noises, passenger noises, and the sound of any media content that may be playing on a media playback system in the vehicle. This noise hampers the ability of the voice-based user interface to interact with a user. Moreover, accessing media content while traveling may be difficult, expensive, or impossible depending on network availability or capacity along the route of travel. Further, accessing and playing media content can require significant amounts of electric power. Thus, use of a mobile device for media content playback during travel may be undesirable because it will drain the battery. It can also be challenging to connect a media playback device to a vehicle's built-in audio system because of the requirement to connect to auxiliary cables or undergo a complicated wireless pairing process. Embodiments disclosed herein address some or all of these challenges. It should be understood, however, that various aspects described herein are not limited to use of a media playback device during travel.

On the other hand, many users desire a personalized media consuming experience. For example, a user can access almost limitless catalogs of media content through various free or fee-based media delivery services, such as media streaming services. Users can use mobile devices or other media playback devices to access large catalogs of media content. Due to such large collections of media content, it is desired to make it possible to customize a selection of media content to match users' individual tastes and preferences so that users can consume their favorite media content while traveling in a vehicle.

Many vehicles include a built-in media playback device, such as a radio or a fixed media player, such as a player that can play media content from a CD, USB driver, or SD cards. However, the media content that is delivered using these built in vehicle media playback devices is greatly limited and is not flexible or customizable to the user.

Alternatively, a mobile device, such as a smartphone or a tablet, can be used by a user to enjoy personalized and flexible music consuming experience in a vehicle by running music streaming applications thereon. However, mobile devices are not well suited for use in a vehicle environment for various reasons. For example, mobile devices are not readily accessible or controllable while driving or navigating. Further, connection between a mobile device and a vehicle audio system is often inconvenient and unreliable. Moreover, the music streaming application is not automatically ready to run and play media content, and the user needs to pick up the mobile device and open the music streaming application and control a sophisticated user interface to play media content. Additionally, many users have limited mobile data available via their mobile devices and are concerned about data usage while using the music streaming application in the vehicle. Battery drainage and legal restrictions on use while driving are further drawbacks to using mobile devices for playing media content in the vehicle.

To address these challenges, the present disclosure provides a special-purpose personal appliance that can be used for streaming media in a vehicle. The appliance is one example of media playback devices of various types, and is also referred to herein as the personal media streaming appliance (PMSA). In some embodiments, the appliance is specially designed to be dedicated for media streaming purposes in a vehicle, and there is no other general use. Some embodiments of the appliance can operate to communicate directly with a media content server and receive streamed media content from the server via a cellular network. In these embodiments, other computing devices, such mobile devices, are not involved in this direct communication between the appliance and the media content server. Mobile data cost can be included in the subscription of the media streaming service or a purchase price of the personal appliance. Therefore, the customer's possible concern about mobile data usage can be eliminated. In other embodiments, the appliance can connect to another computing device, such as a mobile device, that provides a mobile hotspot to enable the appliance to communicate with the media content server rather than the appliance communicating with it directly. For example, a mobile device is used to assist in communication between the appliance and the media content server.

Further, the appliance can be associated with a user account of the user for the media streaming service so that the user can enjoy personalized media content.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input from a user. Examples of such physical control elements include a rotatable knob and one or more physically-depressible buttons.

Further, in some embodiments, the appliance is configured to be easily mounted to an interior structure of a vehicle, such as a dashboard, so that the user can easily reach the appliance.

In some embodiments, the appliance also provides an output interface that can be easily connected to a vehicle audio system, such as via an auxiliary input port or Bluetooth®. Therefore, the media content streamed to the appliance can then be transmitted from the appliance to the vehicle audio system for playback in the vehicle.

In some embodiments, the appliance can includes a voice interaction system designed for voice interaction with a user in the noisy environment of a vehicle. In some embodiments, the appliance includes multiple microphones that reduce the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omni-directional noise cancellation is applied in some embodiments to reduce omni-directional sound (e.g., vehicle noise). Directional noise is detected by determining a difference between audio inputs detected by the two microphones facing the passenger area. The difference is preserved as directional audio input. The appliance further cancels out audio that it is currently playing, allowing the appliance to detect voice commands even over loud music, for instance. In this manner, the appliance is arranged to provide an improved voice-based interface in a vehicle environment.

Further, the present disclosure generally relates to a cloud-based preset for media content playback. The cloud-based preset according to the present disclosure can address various limitations and challenges of conventional preset systems of media playback devices.

Many media playback devices have preset buttons for conveniently playing media content. Such preset buttons can include physical buttons provided on media playback devices, such as preset buttons on audio devices, speakers, or the PMSA as described herein. When a user selects a preset button on a media playback device, the media playback device operates to play back a particular audio content assigned to the selected preset button. Typically, information about the media content for the preset button is locally stored in the media playback device. Therefore, where the media playback device typically has a limited user interface, the user cannot easily edit the preset button to be associated with other media content. Further, when the software and/or firmware of the media playback device are updated, there is a risk of breaking compatibility of the preset button with other media content output systems (e.g., Bluetooth® speakers or vehicle audio systems) connected to the media playback device. Moreover, because the preset button on the media playback device is locally stored and not editable, the user has no option to share the preset media content across other media playback devices.

The present disclosure provides a backend service that stores data about media playback device presets in the cloud, instead of storing the data locally in the media playback device. Because the preset data is stored in the cloud, when a preset button is activated on the media playback device, the media playback device only needs to send minimal data, such as a user account identifier, a device identifier, and/or a preset button identifier, to the backend. Then, the backend identifies a media context (e.g., playlist, album, track, etc.) associated with the selected preset button and transmits the identified media content to the media playback device for playback.

Further, because preset information is stored in the cloud, it is easily sharable across different media playback devices that are linked to the same user account. The preset information that is sharable can include playback state information of a media context that is initiated to be played back when an associated preset button is selected. For example, information about whether a media context associated with a preset button is being currently played or paused, or an elapsed playback time of the media context that is being played or paused.

In addition, the preset data can be updated in real time as the media content is being played on the media playback device. For example, when the user listens to a track by selecting a preset button on a media playback device, the preset data in the cloud is dynamically updated to reflect the current playback state of the track. Therefore, if the user stops or pauses playing the track on that media playback device, the preset data stores information about where the playback of the track ended. When the same track is selected in a different device for playback, the track can be played back from where the track was left off, not from the beginning of the track.

As described herein, consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, a vehicle is described as an example of an environment in which media content is consumed. Further, traveling (and in particular driving) in a vehicle is described as an example of an activity during which media content is consumed. However, it should be understood that the same concepts are similarly applicable to other forms of media consumption and to other environments or activities, and at least some embodiments include other forms of media consumption and/or are configured for use in other environments or during other activities.

FIG. 1 illustrates an example system 100 for streaming media content for playback. The system 100 can be used in a vehicle 80. The vehicle 80 includes a dashboard 82 or a head unit 84. The system 100 includes one or more media playback devices 104 configured to play media content, such as a personal media streaming appliance (PMSA) system 110, a media delivery system 112, a vehicle media playback system 114, and a computing device 118. The system 100 further includes a data communication network 116 and an in-vehicle wireless data communication network 122. The media delivery system 112 includes a preset-based media delivery engine 126.

The PMSA system 110 operates to receive media content that is provided (e.g., streamed, transmitted, etc.) by a system external to the PMSA system 110, such as the media delivery system 112, and transmit the media content to the vehicle media playback system 114 for playback. In some embodiments, the PMSA system 110 is a portable device which can be carried into and used in the vehicle 80. The PMSA system 110 can be mounted to a structure of the vehicle 80, such as the dashboard 82 or the head unit 84. In other embodiments, the PMSA system 110 can be configured to be built in a structure of the vehicle 80. An example of the PMSA system 110 is illustrated and described in more detail with reference to FIGS. 2 and 6.

In some embodiments, the PMSA system 110 includes one or more preset buttons 512, which is further illustrated and described with reference to FIG. 6.

The media delivery system 112 operates to provide media content to one or more media playback devices 104 via the network 116. In the illustrated example, the media delivery system 112 provides media content to the PMSA system 110 for playback of media content using the vehicle media playback system 114. An example of the media delivery system 112 is illustrated and described in further detail herein, such as with reference to FIG. 3.

In some embodiments, the media delivery system 112 includes the preset-based media delivery engine 126. The preset-based media delivery engine 126 operates to determine media content based on a user selection of a preset button 512 of the PMSA system 110, and transmit the media content to the PMSA system 110 for playback. An example of the preset-based media delivery engine 126 is illustrated and described in further detail herein, such as with reference to FIG. 7.

The vehicle media playback system 114 operates to receive media content from the PMSA system 110 and generates a media output 124 to play the media content in the vehicle 80. An example of the vehicle media playback system 114 is illustrated and described in further detail herein, such as with reference to FIG. 4.

The network 116 is a data communication network that facilitates data communication between the PMSA system 110 and the media delivery system 112. In some embodiments, the computing device 118 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth®, ultra-wideband (UWB), 802.11, Zig-Bee, and other types of wireless links. Furthermore, in various embodiments, the network 116 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices 104 (e.g., the computing device 118) and the media delivery system 112. Because the network 116 is configured primarily for data communication between computing devices in the vehicle 80 and computing devices outside the vehicle 80, the network 116 is also referred to herein as an out-of-vehicle network for out-of-vehicle data communication.

Unlike the network 116, the in-vehicle wireless data communication 122 can be used for direct data communication between computing devices (e.g., the media playback devices 104) in the vehicle 80. In some embodiments, the in-vehicle wireless data communication 122 is used for direct communication between the PMSA system 110 and the computing device 118. In other embodiments, the computing device 118 can communicate with the PMSA system 110 in the data communication network 116. In some embodiments, the in-vehicle wireless data communication 122 can also be used for data communication between the PMSA system 110 and the vehicle media playback system 114.

Various types of wireless communication interfaces can be used for the in-vehicle wireless data communication 122. In some embodiments, the in-vehicle wireless data communication 122 includes Bluetooth® technology. In other embodiments, the in-vehicle wireless data communication 122 includes WiFi® technology. In yet other embodiments, other suitable wireless communication interfaces can be used for the in-vehicle wireless data communication 122, such as near field communication (NFC) and an ultrasonic data transmission.

In some embodiments, the computing device 118 is configured to play media content independently from the PMSA system 110. In some embodiments, the computing device 118 is a tandalone computing device that, without the PMSA system 110 involved, can communicate with the media delivery system 112 and receive media content from the media delivery system 112 for playback in the vehicle 80. An example of the computing device 118 is illustrated and described in further detail herein, such as with reference to FIG. 5.

Figure 2:
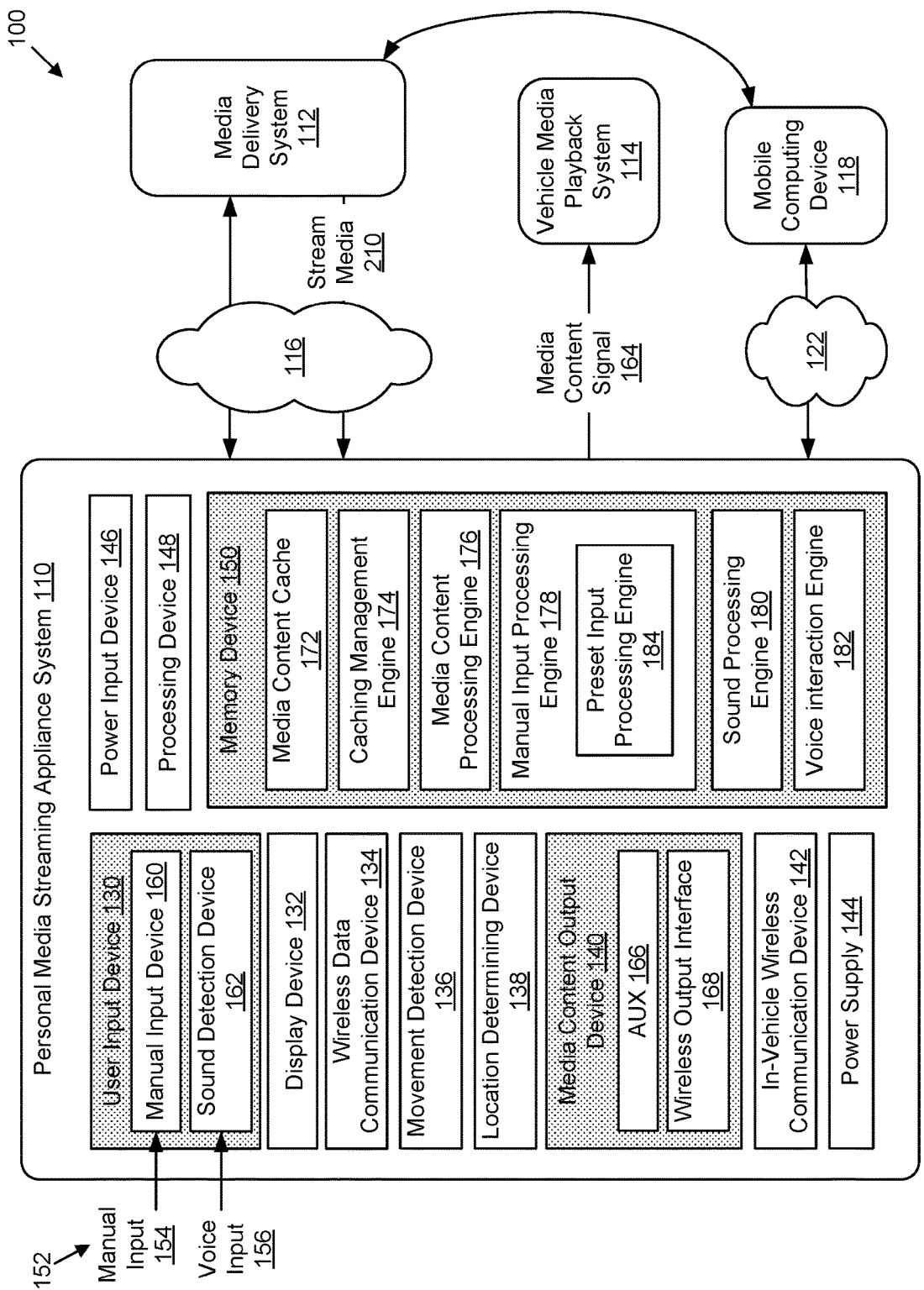
FIG. 2 is a block diagram of an example embodiment of a personal media streaming appliance (PMSA) system.

FIG. 2 is a block diagram of an example embodiment of the PMSA system 110 of the media streaming system 100 shown in FIG. 1. In this example, the PMSA system 110 includes a user input device 130, a display device 132, a wireless data communication device 134, a movement detection device 136, a location determining device 138, a media content output device 140, an in-vehicle wireless communication device 142, a power supply 144, a power input device 146, a processing device 148, and a memory device 150.

In some embodiments, the PMSA system 110 is a system dedicated for streaming personalized media content in a vehicle environment. At least some embodiments of the PMSA system 110 have limited functionalities specifically selected for streaming media content from the media delivery system 112 at least via the network 116 and/or for providing other services associated with the media content streaming service. The PMSA system 110 may have no other general use such as found in other computing devices, such as smartphones, tablets, and other smart devices. For example, in some embodiments, when the PMSA system 110 is powered up, the PMSA system 110 is configured to automatically activate a software application that is configured to perform the media content streaming and media playback operations of the PMSA system 110 using at least one of the components, devices, and elements of the PMSA system 110. In some embodiments, the software application of the PMSA system 110 is configured to continue running until the PMSA system 110 is powered off or powered down to a predetermined level. In some embodiments, the PMSA system 110 is configured to be free of any user interface control that would allow a user to disable the automatic activation of the software application on the PMSA system 110.

As described herein, the PMSA system 110 provides various structures, features, and functions that improve the user experience of consuming media content in a vehicle.

As illustrated, the PMSA system 110 can communicate with the media delivery system 112 to receive media content via the network 116 and enable the vehicle media playback system 114 to play the media content in the vehicle. In some embodiments, the PMSA system 110 can communicate with the computing device 118 that is in data communication with the media delivery system 112. As described herein, the computing device 118 can communicate with the media delivery system 112 via the network 116.

The user input device 130 operates to receive a user input 152 from a user U for controlling the PMSA system 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA system 110. In addition, in some embodiments, the manual input 154 is received for managing various pieces of information transmitted via the PMSA system 110 and/or controlling other functions or aspects associated with the PMSA system 110.

In some embodiments, the manual input device 160 includes one or more manual control elements configured to receive various manual control actions, such as pressing actions and rotational actions. As described herein, the physical input device 160 includes a manual control knob 510 and one or more preset buttons 512, which is further illustrated and described with reference to FIG. 6.

The sound detection device 162 operates to detect and record sounds from proximate the PMSA system 110. For example, the sound detection device 162 can detect sounds including the voice input 156. In some embodiments, the sound detection device 162 includes one or more acoustic sensors configured to detect sounds proximate the PMSA system 110. For example, acoustic sensors of the sound detection device 162 include one or more microphones. Various types of microphones can be used for the sound detection device 162 of the PMSA system 110.

In some embodiments, the voice input 156 is a user's voice (also referred to herein as an utterance) for controlling playback of media content via the PMSA system 110. In addition, the voice input 156 is a user's voice for managing various data transmitted via the PMSA system 110 and/or controlling other functions or aspects associated with the PMSA system 110.

In some embodiments, the sound detection device 162 is configured to cancel noises from the received sounds so that a desired sound (e.g., the voice input 156) is clearly identified. For example, the sound detection device 162 can include one or more noise-canceling microphones which are configured to filter ambient noise from the voice input 156. In addition or alternatively, a plurality of microphones of the sound detection device 162 are arranged at different locations in a body of the PMSA system 110 and/or oriented in different directions with respect to the body of the PMSA system 110, so that ambient noise is effectively canceled from the voice input 156 or other desired sounds being identified.

In some embodiments, the sounds detected by the sound detection device 162 can be processed by the sound processing engine 180 of the PMSA system 110 as described below.

Referring still to FIG. 2, the display device 132 operates to display information to the user U. Examples of such information include media content playback information, notifications, and other information.

In some embodiments, the display device 132 operates as a display screen only and is not capable of receiving a user input. By receiving the manual input 154 only via the manual input device 160 and disabling receipt of manual input via the display device 132, the user interface of the PMSA system 110 is simplified so that the user U can control the PMSA system 110 while maintaining focus on other activities in the vehicle 80. It is understood however that, in other embodiments, the display device 132 is configured as a touch-sensitive display screen that operates as both a display screen and a user input device. In yet other embodiments, the PMSA system 110 does not include a display device.

As described herein, in some embodiments, the display device 132 is arranged at the manual input device 160. In other embodiments, the display device 132 is arranged separate from the manual input device 160.

The wireless data communication device 134 operates to enable the PMSA system 110 to communicate with one or more computing devices at a remote location that is outside the vehicle 80. In the illustrated example, the wireless data communication device 134 operates to connect the PMSA system 110 to one or more networks outside the vehicle 80, such as the network 116. For example, the wireless data communication device 134 is configured to communicate with the media delivery system 112 and receive media content from the media delivery system 112 at least partially via the network 116. The wireless data communication device 134 can be a wireless network interface of various types which connects the PMSA system 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In the some embodiments, the wireless data communication device 134 is configured as a cellular network interface to facilitate data communication between the PMSA system 110 and the media delivery system 112 over cellular network.

The movement detection device 136 can be used to detect movement of the PMSA system 110 and the vehicle 80. In some embodiments, the movement detection device 136 is configured to monitor one or more factors that are used to determine movement of the vehicle 80. The movement detection device 136 can include one or more sensors that are configured to detect movement, position, and/or orientation of the PMSA system 110. As an example, the movement detection device 136 is operable to determine an orientation of the PMSA system 110. The movement detection device 136 can detect changes in the determined orientation and interpret those changes as indicating movement of the PMSA system 110. In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA system 110. In some embodiments, the location determining device 138 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The media content output device 140 is an interface that enables the PMSA system 110 to transmit media content to the vehicle media playback device 114. Some embodiments of the PMSA system 110 do not have a speaker and thus cannot play media content independently. In these embodiments, the PMSA system 110 is not regarded as a standalone device for playing media content. Instead, the PMSA system 110 transmits media content to another media playback device, such as the vehicle media playback device 114 to enable the other media playback device to play the media content, such as through the vehicle stereo system.

As illustrated, the PMSA system 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

The AUX output interface 166 is configured to connect the PMSA system 110 to the vehicle media playback system 114 via a cable (e.g., a media content output line 550 in FIG. 6) of the PMSA system 110. In some embodiments, as illustrated in FIG. 6, the media content output line 550 extending from the PMSA system 110 is connected to an input connector 340 (e.g., an auxiliary input jack or port) of the vehicle media playback system 114. As illustrated herein, the media content output line 550 can be of various types, such as an analog audio cable ora USB cable.

The wireless output interface 168 is configured to connect the PMSA system 110 to the vehicle media playback system 114 via a wireless communication protocol. In some embodiments, the wireless output interface 168 is configured for Bluetooth® connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication, such as the in-vehicle wireless data communication 122, between computing devices in a vehicle 80. In the illustrated example, the in-vehicle wireless communication device 142 is used to enable the PMSA system 110 to communicate with other computing devices, such as the computing device 118, in the vehicle 80. Various types of wireless communication interfaces can be used for the in-vehicle wireless communication device 142, such as Bluetooth® Technology®, WiFi® technology, a near field communication (NFC), and an ultrasound data transmission. The in-vehicle wireless communication is also referred to herein as a short-range wireless communication.

The power supply 144 is included in the example PMSA system 110 and is configured to supply electric power to the PMSA system 110. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the PMSA system 110 and is not removable from the PMSA system 110. In other embodiments, the power supply 144 is removable by the user from the PMSA system 110.

The power input device 146 is configured to receive electric power to maintain activation of components of the PMSA system 110. As described herein, the power input device 146 is connected to a power source of the vehicle 80 (e.g., a vehicle power supply 540 in FIG. 6) and use the electric power from the vehicle 80 as a primary power source to maintain activation of the PMSA system 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the PMSA system 110. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA system 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, and a voice interaction engine 182. The manual input processing engine 178 can include a preset input processing engine 184.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA system 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., the user command or instruction) corresponding to the manual input 154 to the PMSA system 110. In some embodiments, the manual input processing engine 178 can perform a function requested by the manual input 154, such as controlling playback of media content. The manual input processing engine 178 can cause one or more other engines to perform the function associated with the manual input 154.

Figure 7:
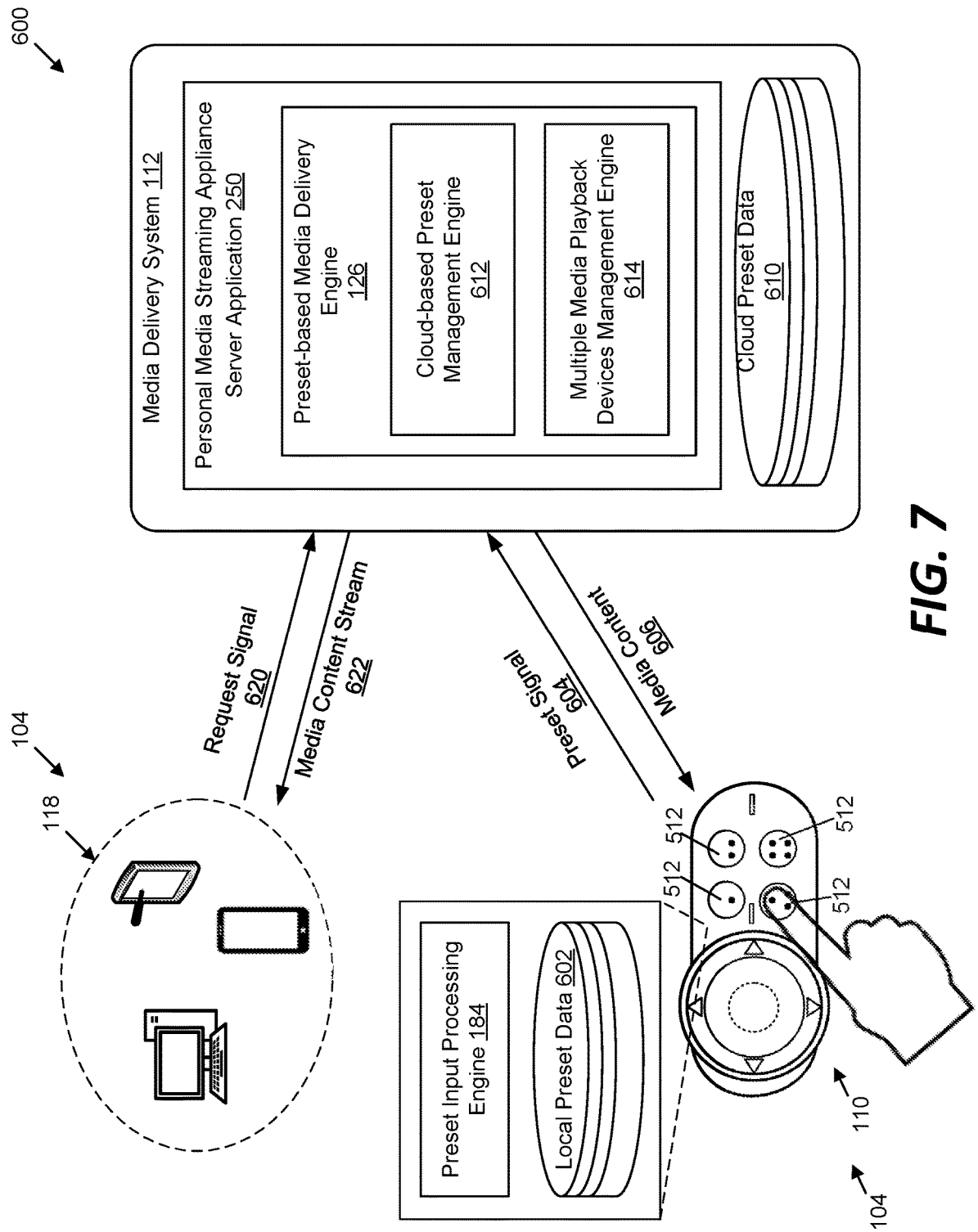
FIG. 7 illustrates an example system for media content playback using a cloud-based preset.

In some embodiments, the manual input processing engine 178 includes the preset input processing engine 184. The preset input processing engine 184 operates to receive a user input via a preset button 512 (as an example of the manual input 154) and transmit data to the media delivery system 112 so that the media delivery system 112 processes the request as identified by the transmitted data. In some embodiments, when the PMSA system 110 receives a user selection of a preset button 512, the preset input processing engine 184 generates and transmits a preset signal (as shown in FIG. 7) to the media delivery system 112, and the media delivery system 112 operates to determine media content associated with the selected preset button 512. An example of includes the preset input processing engine 184 is illustrated and described in further detail herein, such as with reference to FIG. 7.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 from noises included in the detected sounds. Various noise cancellation technologies, such as active noise control or canceling technologies or passive noise control or canceling technologies, can be used for filter the voice input from ambient noise. In examples, the sound processing engine 180 filters out omnidirectional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspects of the PMSA system 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the PMSA system 110 such as volume, dominant frequency or frequencies, etc. These sound properties may be used to make inferences about the environment proximate to the PMSA system 110.

Figure 3:
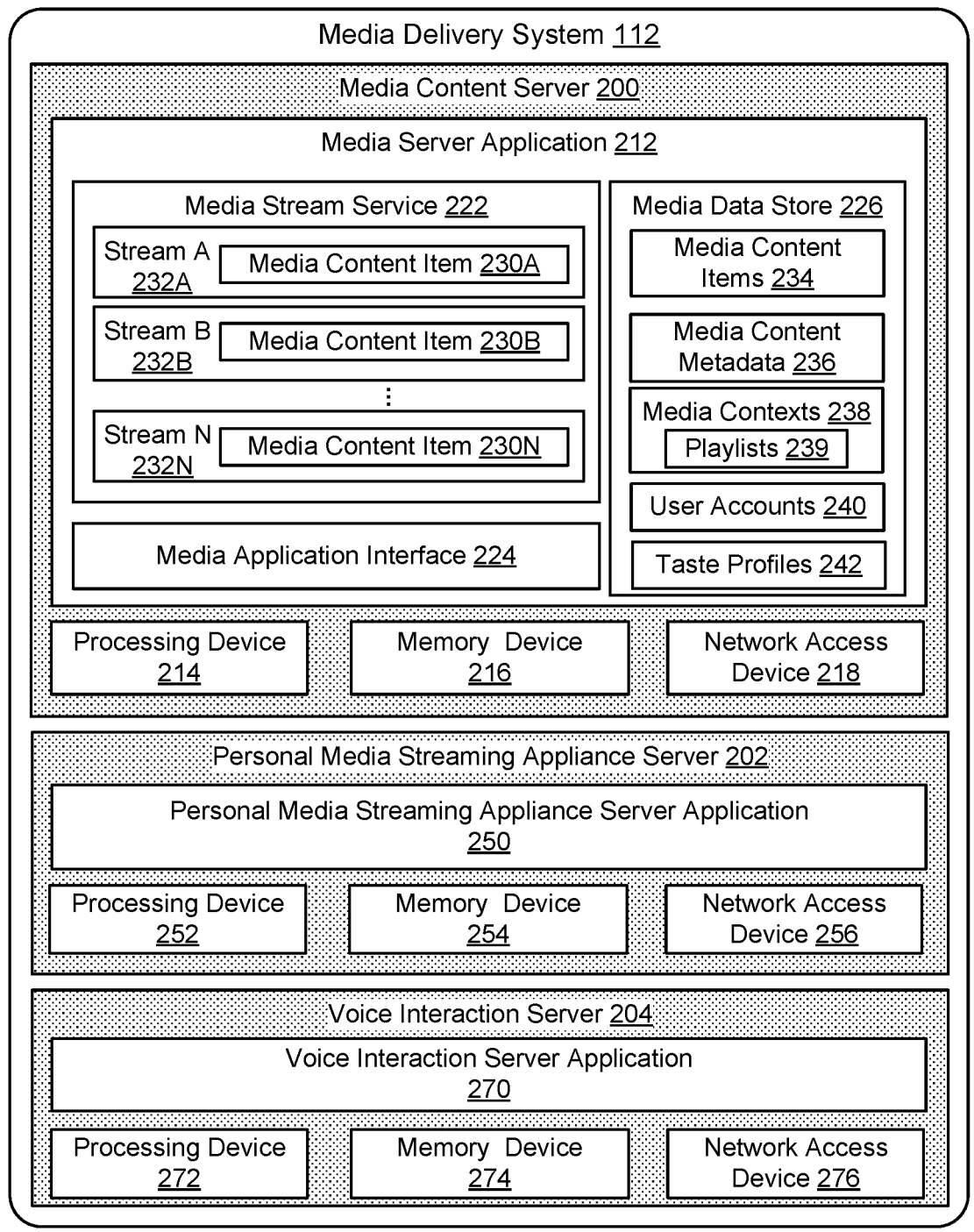
FIG. 3 is a block diagram of an example embodiment of a media delivery system.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the user's voice input 156 that is detected by the sound processing engine 180 to the media delivery system 112 so that the media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

FIG. 3 is a block diagram of an example embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA system 110 and, in some embodiments, other media playback devices, such as the computing device 118, as well. In addition, the media delivery system 112 interacts with the PMSA system 110 to provide the PMSA system 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA serves, and multiple voice interaction servers may be identical or similar to the media content server 200, the PMSA server 202, and the voice interaction server, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA system 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 116. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA system 110, to retrieve media content items from the media content server 200. For example, in FIG. 2, the media application interface 224 receives communication from the PMSA system 110, such as the caching management engine 174 thereof, to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML, or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device 104, such as the PMSA system 110. The media playback device 104 then operates to communicate with the media delivery system 112 so that the media delivery system 112 retrieves the media content items identified by the playlist 239 and transmits data for the media content items to the media playback device 104 for playback.

In some embodiments, the playlist 239 includes a playlist title and a list of content media item identifications. The playlist title is a title of the playlist, which can be provided by a user using the media playback device 104. The list of content media item identifications includes one or more media content item identifications (IDs) that refer to respective media content items 170.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 112 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 239 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA system 110 and the computing device 118) to log into the user account and access data associated with the user account in the media delivery system 112. User authentication information, such as a username, email account information, a password, and other credentials, can be used for the user to log into his or her user account.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences.

In some embodiments, each taste profile 242 is a representation of musical activities, such as user preferences and historical information about the user's consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based the user's selection of media content items and/or artists for a playlist.

Referring still to FIG. 3, the PMSA server 202 operates to provide various functionalities to the PMSA system 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA system 110 and enable the PMSA system 110 to perform various functions, such as receiving a user manual input, displaying information, providing notifications, performing power management, providing location-based services, and authenticating one or more users for the PMSA system 110. The PMSA server application 250 can interact with other servers, such as the media content server 200 and the voice interaction server 204, to execute such functions. An example of the PMSA server application 250 is illustrated and described in further detail herein, such as with reference to FIG. 7.

Referring still to FIG. 3, the voice interaction server 204 operates to provide various voice-related functionalities to the PMSA system 110. In some embodiments, the voice interaction server 204 includes a voice interaction server application 270, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the voice interaction server application 270 operates to interact with the PMSA system 110 and enable the PMSA system 110 to perform various voice-related functions, such as voice feedback and voice notifications. In some embodiments, the voice interaction server application 270 is configured to receive data (e.g., speech-to-text (STT) data) representative of a voice input received via the PMSA system 110 and process the data to determine a user command (e.g., a user request or instruction). In some embodiments, at least one of the media content server 200, the PMSA server 202, and the voice interaction server 204 may be used to perform one or more functions corresponding the determined user command.

Figure 4:
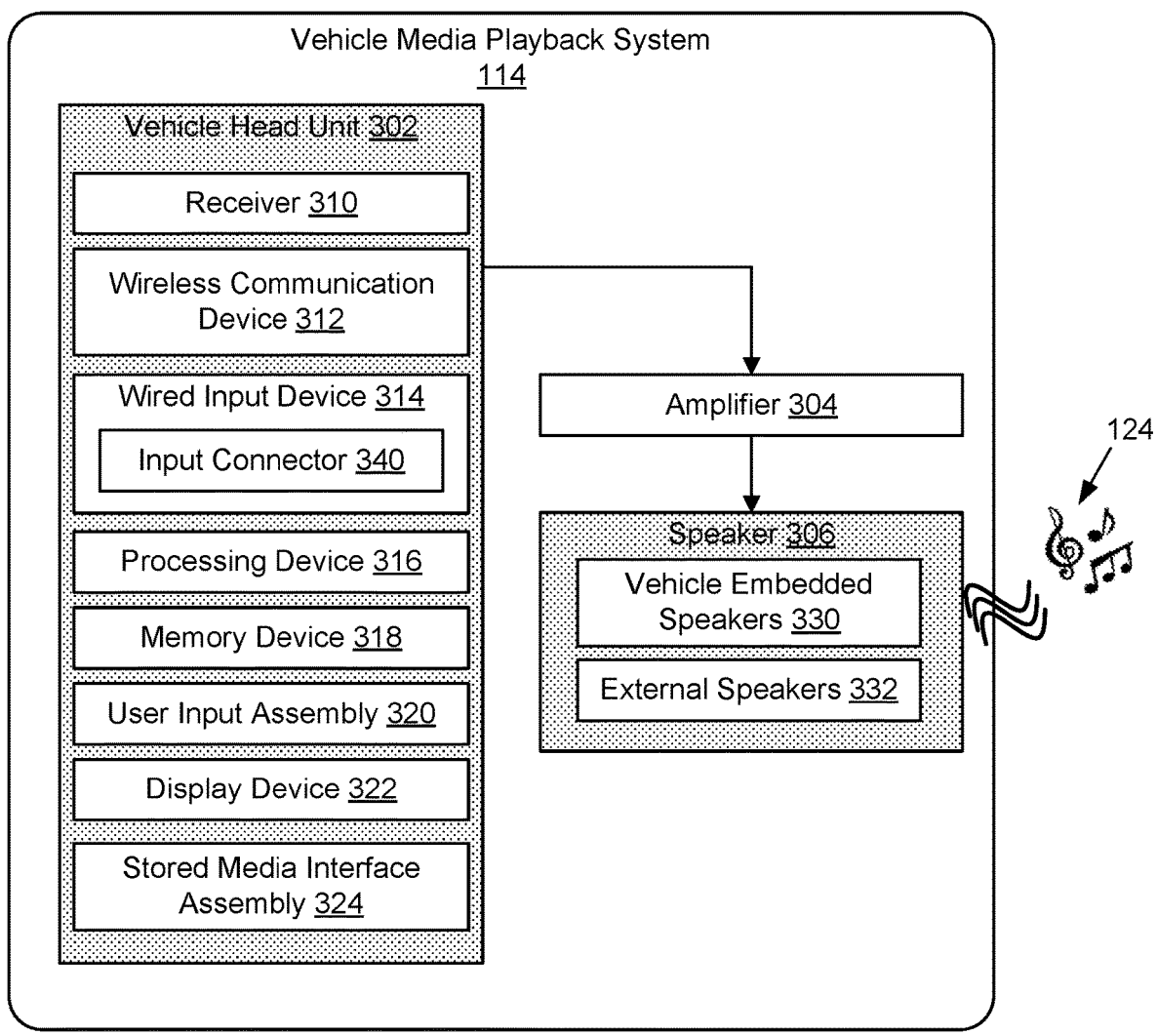
FIG. 4 is a block diagram of an example embodiment of a vehicle media playback system.

FIG. 4 is a block diagram of an example embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 264. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth® transceiver and a WiFi® transceiver. The wireless data signal may comprise a media content signal such as an audio or video signal. In some embodiments, the wireless communication device 312 is used to enable the vehicle media playback system 114 to wirelessly communicate with the PMSA system 110 and receive the media content signal 164 (FIG. 2) from the PMSA system 110 via an in-vehicle wireless network. The in-vehicle wireless network between the PMSA system 110 and the vehicle media playback system 114 can be configured similarly to the in-vehicle wireless data communication 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, DVI). In some embodiments, the wired input device 314 is also used to receive instructions from other devices.

Figure 6:
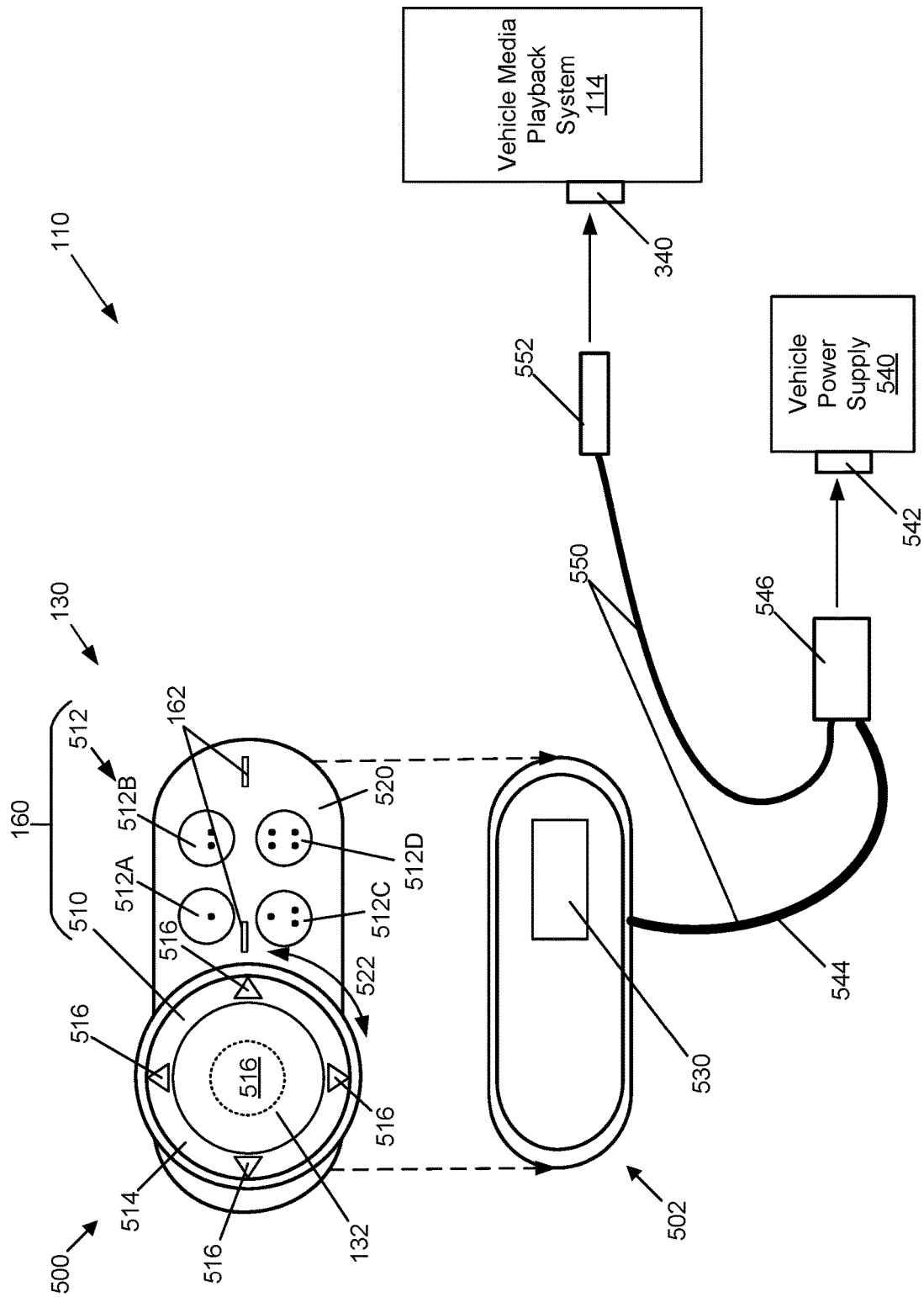
FIG. 6 schematically illustrates an example embodiment of the PMSA system.

In some embodiments, the wired input device 314 provides the input connector 340 (e.g., an AUX port) for receiving a connector 552 extending from the PMSA system 110, as illustrated in FIG. 6. The media content signal 164 is then transmitted from the PMSA system 110 to the vehicle media playback system 114 via the cable 550, the connector 552, and the input connector 340.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 164 received from the PMSA system 110 and convert the signal 164 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 80. Users may bring one or more external speakers 332 into the vehicle 80 and connect the external speakers 332 to the vehicle head unit 302 using a wired interface or a wireless interface. In some embodiments, the external speakers 332 can be connected to the vehicle head unit 302 using Bluetooth®. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

Figure 5:
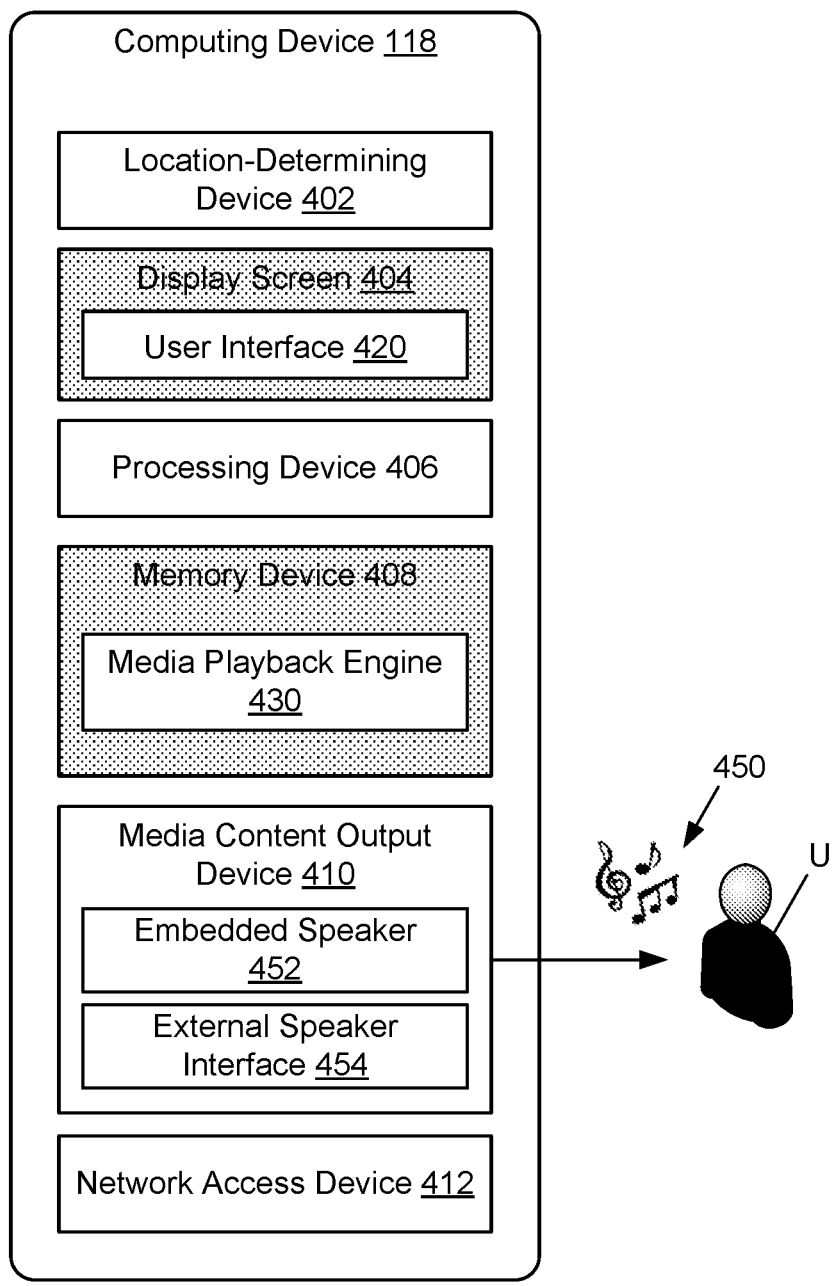
FIG. 5 is a block diagram of an example embodiment of a computing device.

FIG. 5 is a block diagram of an example embodiment of the computing device 118 of FIG. 1.

Similar to the PMSA system 110, the computing device 118 can also be used to play media content. For example, the computing device 118 is configured to play media content that is provided (e.g., streamed or transmitted) by a system external to the computing device 118, such as the media delivery system 112, another system, or a peer device. In other examples, the computing device 118 operates to play media content stored locally on the computing device 118. In yet other examples, the computing device 118 operates to play media content that is stored locally as well as media content provided by other systems.

In some embodiments, the computing device 118 is a mobile device, such as a handheld or portable entertainment device, smartphone, tablet, watch, wearable device, or any other type of computing device capable of playing media content. In other embodiments, the computing device 118 is a laptop computer, desktop computer, television, gaming console, set-top box, network appliance, blue-ray or DVD player, media player, stereo, or radio.

As described herein, the computing device 118 is distinguished from the PMSA system 110 in various aspects. For example, unlike the PMSA system 110, the computing device 118 is not limited to playing media content, but configured for a wide range of functionalities in various situations and places. The computing device 118 is capable of running a plurality of different software applications for different purposes. The computing device 118 enables the user to freely start or stop activation of such individual software applications.

In at least some embodiments, the computing device 118 includes a location-determining device 402, a display screen 404, a processing device 406, a memory device 408, a media content output device 410, and a network access device 412. Other embodiments may include additional, different, or fewer components. For example, some embodiments may include a recording device such as a microphone or camera that operates to record audio or video content.

The location-determining device 402 is a device that determines the location of the computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi® positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430.

The memory device 408 may be configured similarly to the memory device 150 (FIG. 2) and, therefore, the description of the memory device 408 is omitted for brevity purposes.

The media playback engine 430 operates to play media content to the user U. As described herein, the media playback engine 430 is configured to communicate with the media delivery system 112 to receive one or more media content items (e.g., through the stream media 232). In other embodiments, the media playback engine 430 is configured to play media content that is locally stored in the computing device 118.

In some embodiments, the media playback engine 430 operates to retrieve one or more media content items that are either locally stored in the computing device 118 or remotely stored in the media delivery system 114. In some embodiments, the media playback engine 430 is configured to send a request to the media delivery system 114 for media content items and receive information about such media content items for playback.

Referring still to FIG. 5, the media content output device 410 operates to output media content. In some embodiments, the media content output device 410 generates media output 450 for the user U. In some embodiments, the media content output device 410 includes one or more embedded speakers 452 which are incorporated in the computing device 118. Therefore, the computing device 118 can be used as a standalone device that generates the media output 450.

In addition, some embodiments of the computing device 118 include an external speaker interface 454 as an alternative output of media content. The external speaker interface 454 is configured to connect the computing device 118 to another system having one or more speakers, such as headphones, portal speaker assemblies, and the vehicle media playback system 114, so that the media output 450 is generated via the speakers of the other system external to the computing device 118. Examples of the external speaker interface 454 include an audio output jack, a Bluetooth® transmitter, a display panel, and a video output jack. Other embodiments are possible as well. For example, the external speaker interface 454 is configured to transmit a signal through the audio output jack or Bluetooth® transmitter that can be used to reproduce an audio signal by a connected or paired device such as headphones or a speaker.

The network access device 412 operates to communicate with other computing devices over one or more networks, such as the network 116 and the in-vehicle wireless data communication 122. Examples of the network access device 412 include wired network interfaces and wireless network interfaces. Wireless network interfaces includes infrared, Bluetooth® wireless technology, 802.11a/b/g/n/ac, and cellular or other radio frequency interfaces in at least some possible embodiments.

FIG. 6 schematically illustrates an example embodiment of the PMSA system 110 of FIG. 1. In this example, the PMSA system 110 includes a personal media streaming appliance (PMSA) 500 and a docking device 502.

As described herein, the PMSA system 110 is sized to be relatively small so that the PMSA system 110 can be easily mounted to a structure (e.g., a dashboard or head unit) of the vehicle 80 where the user can conveniently manipulate the PMSA system 110. By way of example, the PMSA system 110 is configured to be smaller than a typical mobile computing device, such as a smartphone. Further, the PMSA 500 provides a simplified user interface for controlling playback of media content. For example, the PMSA 500 has a limited set of physical control elements, such as a single rotary knob and one or more physical buttons as described below, so that the user can easily control the PMSA system 110 in the vehicle 80 (FIG. 1).

The PMSA 500 is configured to include at least some of the devices of the PMSA system 110 as illustrated with reference to FIG. 2. In some embodiments, the PMSA 500 includes all of the devices of the PMSA system 110 as illustrated in FIG. 2.

As illustrated also in FIG. 2, some embodiments of the PMSA 500 include the user input device 130 that includes the manual input device 160 and the sound detection device 162. Some embodiments of the manual input device 160 include a control knob 510 and one or more physical buttons 512.

In some embodiments, the control knob 510 is configured to be maneuverable in multiple ways. For example, the control knob 510 provides a plurality of regions on a knob face 514 that are independently depressible upon receiving a user's pressing action against the knob face 514. In the illustrated example, the control knob 510 has five regions 516 (e.g., up, down, left, right, and middle) that are separately depressible. At least some of the regions 516 are configured to receive inputs of different user commands (e.g., requests or instructions).

In other embodiments, the control knob 510 is configured to be manipulated in different ways, such as tilting in multiple directions or sliding in multiple directions.

In addition, the control knob 510 is configured to be rotatable. For example, the user can hold the control knob 510 and rotate with respect to a body 520 of the PMSA 500. The control knob 510 can be rotatable in both directions 522 (e.g., clockwise and counterclockwise). In other embodiments, the control knob 510 is configured to rotate in only one direction.

The control knob 510 is used to receive user inputs for controlling playback of media content. In addition or alternatively, the control knob 510 can be used to receive user inputs for other purposes or functions.

The physical buttons 512 are configured to be depressed upon receiving a user's pressing action against the physical buttons 512. In the illustrated example, the PMSA 500 has four physical buttons 512A-512D. In some embodiments, each of the physical buttons 512 is configured to receive a single user command. In other embodiments, at least one of the physical buttons 512 is configured to receive multiple user commands.

In some embodiments, the physical buttons 512 are used as buttons that are preset to be associated with particular media content, thereby facilitating playback of such media content. In these embodiments, the physical buttons 512 are also referred to as preset buttons 512.

In some embodiments, the preset buttons 512 are configured to receive the manual input 154 to play media content that are preset to the respective preset buttons 512. In some embodiments, the preset button assemblies 512 are arranged at the front side of the body 520. In the illustrated example, four preset buttons 512A, 512B, 512C, and 512D (collectively 512) are provided at the front side of the body 520.

The preset buttons 512 can be distinguished from each other in various methods. In the illustrated example, different numbers of dots are used to indicate different preset buttons 512. For example, the preset buttons 512A, 512B, 512C, and 512D are provided with one dots, two dots, three dots, and four dots, respectively. The dots can be configured with at least partially tubes that can protrude above the surface of the front side to provide tactile sensation when touched or pressed by a user. The dots can be made of at least transparent material and lit by one or more light sources from the inside of the body 520. In other embodiments, different symbols, signs, or indicia can be used to differentiate the preset buttons 512.

In some embodiments, the preset buttons 512 can be actuated by a pressing action against the preset buttons 512. For example, the preset buttons 512 are configured to be depressed when a user presses the preset buttons 512 against the surface of the front side of the body 520, and the preset buttons 512 operate to detect the depression thereof.

In some embodiments, each of the preset buttons 512 is configured to receive a single user command. For example, the preset button assemblies 512 are configured such that a single pressing action against each of them corresponds to a single input. In other embodiments, at least one of the preset buttons 512 is configured to receive multiple user commands. For example, different pressing actions (e.g., a set of pressing and releasing, a set of pressing and holding for a predetermined period of time, a set of multiple pressings for a predetermined of time, etc.) can correspond to different user inputs.

In other embodiments, the physical buttons 512 can be used for non-content related actions. By way of example, the physical buttons 512 can be used for playback control actions, such as playback mode (e.g., shuffle, repeat, normal, etc.), playback speed (e.g., normal, slower, faster, etc.), crossfade (e.g., crossfade length), equalizer settings, audio normalization, and other possible settings relating to media content playback. Further, the physical buttons 512 can be used to connect the PMSA system 110 with other devices, such as the computing device 118.

It should be understood that physical buttons 512 can be any known or future developed component that is used to provide an activation signal to a processing device. For example physical buttons 512 can be mechanical button switches, conductive button switches, or capacitive button switches.

Although the present disclosure is primarily described herein with reference to physical preset buttons of the media playback device 104, such as the PMSA system 110, it is understood that the present disclosure is similarly applicable for other types of presets in the media playback device 104, such as presets that are voice-controlled without physical buttons. For example, the presets associated with the physical preset buttons 512 can be also activated by a voice command. By way of example, the PMSA system 110 receives a voice command from a user that requests for media content associated with a preset button 512, and the voice command (e.g., an utterance) is analyzed to identify the user request. Such analysis can be performed either locally in the PMSA system 110 or in the backend server (e.g., the media delivery system 112), or both. Then, the media delivery system 112 can determine media content associated with the preset button 512 and transmit a signal representative of the media content to the PMSA system 110 for playback.

In other embodiments, in addition to, or alternative to, the physical preset buttons 512, voice-only presets can be provided for the PMSA system 110. Such voice-only presets can be created and stored in the PMSA system 110 locally and/or in the backend server, and be operated only by a voice command. In some embodiments, the voice-only presets can be shared among different media playback devices associated with the same user account.

In addition, the PMSA 500 also includes the display device 132. In some embodiments, the display device 132 is arranged at the knob face 514 of the control knob 510. As described herein, in some embodiments, the display device 132 does not include a touch sensitive display screen, and is configured as a display device only. In other embodiments, however, the display device 132 can be configured to be touch sensitive and receive a user input through the display device 132 as well.

Referring still to FIG. 6, the docking device 502 is configured to mount the PMSA 500 to a structure of the vehicle 80. The docking device 502 is configured to removably mount the PMSA 500 thereto. The docking device 502 is further configured to attach to a structure of the vehicle 80 (FIG. 1) so that the PMSA 500 is positioned at the structure of the vehicle 80.

In some embodiments, an interface between the PMSA 500 and the docking device 502 is configured to prevent the PMSA 500 from rotating relative to the docking device 502 when the control knob 510 is manipulated by a user. For example, the docking device 502 has a portion (e.g., a front portion of the docking device 502) configured to interlock a corresponding portion of the PMSA 500 (e.g., a rear portion of the PMSA 500) when the PMSA 500 is mounted to the docking device 502 such that the portion of the docking device 502 and the corresponding portion of the PMSA 500 form the interface therebetween.

In addition or alternatively, the PMSA 500 and the docking device 502 include magnetic materials at the interface therebetween so that the PMSA 500 and the docking device 502 are magnetically coupled to each other.

In some embodiments, the docking device 502 includes one or more electrical contacts 530 that are electrically connected to corresponding electrical contacts (not shown in FIG. 6) of the PMSA 500 when the PMSA 500 is mounted to the docking device 502. Such electrical connection between the PMSA 500 and the docking device 502 is provided for various functions.

First, as described herein, the PMSA 500 does not include a battery sufficient for a prolonged use without an external power supply. In some embodiments, the PMSA 500 is primarily powered by a vehicle power supply 540. In some embodiments, the docking device 502 has a power receiving line 544 for connection to the vehicle power supply 540. For example, the power receiving line 544 extends from the docking device 502 and has a power connector 546 at a free end that is configured to mate with a vehicle power outlet 542 (e.g., a 12V auxiliary power outlet) of the vehicle power supply 540. As such, the docking device 502 receives electric power from the vehicle power supply 540 via the power receiving line 544, and the electrical connection between the PMSA 500 and the docking device 502 is configured to deliver electric power from the docking device 502 to the PMSA 500.

Second, as described herein, the PMSA 500 does not have a speaker and is designed to transmit media content signals to the vehicle media playback system 114 so that the media content is played through the vehicle media playback system 114. In some embodiments, the docking device 502 includes a media content output line 550 (also referred to herein as a media content output cable) (e.g., an auxiliary (AUX) output) configured to connect with the vehicle media playback input connector 340 (e.g., an auxiliary (AUX) port) of the vehicle media playback system 114. The docking device 502 is configured to receive media content signals from the PMSA 500 via the electrical connection between the PMSA 500 and the docking device 502, and transmit the signals to the vehicle media playback system 114 via the media content output line 550. In the illustrated embodiment, the power receiving line 544 and the media content output line 550 are combined to be a single line extending from the docking device 502 until the power connector 546, and the media content output line 550 further extends (or branches out) from the power connector 546 and terminates at a media output connector 552. The media output connector 552 is configured to connect to the vehicle media playback input connector 340 of the vehicle media playback system 114. In other embodiments, the media content output line 550 and the power receiving line 544 extend separately from the docking device 502.

In other embodiments, one or more of the power receiving line 544 and the media content output line 550 are directly connected to, and extend from, the PMSA 500 so that electric power is directly supplied to the PMSA 500 without the docking device 502 involved, and that the media content is directly transmitted to the vehicle media playback system 114 without passing through the docking device 502.

Third, the electrical connection between the PMSA 500 and the docking device 502 can be used to detect connection between the PMSA 500 and the docking device 502.

FIG. 7 illustrates an example system 600 for media content playback using a cloud-based preset. In some embodiments, the system 600 is implemented at least in part with the system 100 as described herein. For example, the system 600 includes the PMSA system 110, the media delivery system 112, and one or more computing devices 118. As described herein, the PMSA system 110, the media delivery system 112, and the computing devices 118 can be in data communication via the data communication network 116 as illustrated in FIG. 1.

In some embodiments, the system 600 is configured such that the media delivery system 112 stores data about the preset buttons 512 of the PMSA system 110. For example, media content (e.g., media contexts) assigned to the preset buttons 512 and/or playback information about the media content assigned to the preset buttons 512 are stored in the media delivery system 112. The media delivery system 112 operates to modify the data about the preset buttons 512 as information of the data (e.g., settings or playback states of the preset buttons 512) is changed. For example, when another media content is newly assigned to a preset button 512 of the PMSA system 110, the media delivery system 112 stores such a new assignment to the preset button 512 so that the new media content that is now associated with the preset button 512 can be identified within the media delivery system 112, with no need of communicating with the PMSA system 110 to obtain the new media content therefrom. Further, as the data about the preset buttons 512 of the PMSA system 110 is stored in the media delivery system 112, the data can be shared among other devices than PMSA system 110, such as the computing devices 118.

Although the PMSA system 110 is primarily described in this example to include preset buttons and associated elements (e.g., engines), it is understood that any other media playback devices 104, such as the computing devices 118, can be configured to have one or more preset buttons and associated elements and perform the same or similar functions as the PMSA system 110.

In some embodiments, the PMSA system 110 includes the preset input processing engine 184 (as described also in FIG. 2) and local preset data 602.

As described herein, the preset input processing engine 184 operates to receive a user input (e.g., the manual input 154) via a preset button 512 of the PMSA system 110. The preset button 512 can be configured to be actuated in various methods for receiving a user input. In some embodiments, the preset button 512 is configured as a physically depressible button. In these embodiments, the preset button 512 can be actuated by being depressed, which is caused by a pressing action using a user's finger or another body portion.

The preset input processing engine 184 can be configured to interpret and process different user actions against the preset button 512 as different user inputs. By way of example, in the embodiments where the preset button 512 is a physically depressible button, a single action of pushing and releasing the preset button 512 can be interpreted as a request for playing a media context assigned to the preset button 512 if the media context is not currently playing. If the media context is currently playing, the same single action of pushing and releasing the preset button 512 can be determined as a request for stopping (including pausing) the playback of the media context. In addition, while a media context that is not assigned to the preset button 512 is currently playing, an action of pushing the preset button 512 and holding it for a predetermined of time (e.g., 2 seconds) can be used as a request for assigning the currently-playing media context to the preset button 512. In other embodiments, other actions against the preset button 512 can be associated with the user requests above or any other user requests.

When the preset button 512 is actuated (e.g., pressed) upon receiving the user input, the preset button 512 can generate a signal representative of the user input. The preset input processing engine 184 can operate to receive and process the signal and determine a request (also referred to herein as a command or instruction) intended by the user input via the preset button 512.

In some embodiments, the preset input processing engine 184 further operates to generate and transmit a preset signal 604 to the media delivery system 112. The preset signal 604 includes the request received via the preset button 512. In some embodiments, the request includes a request for playback of media content associated with the preset button 512. Therefore, the preset button 512 is an example of a preset signal source. When the media delivery system 112 receives the preset signal 604, the media delivery system 112 can identify the media content assigned to the preset button 512 and transmit the media content 232 to the PMSA system 110 for playback. An example of the preset signal 604 is illustrated and described in further detail herein, such as with reference to FIG. 9. An example method of operating the preset input processing engine 184 is illustrated and described in further detail herein, such as with reference to FIG. 12.

In some embodiments, the PMSA system 110 stores the local preset data 602. The local preset data 602 can be stored locally in the PMSA system 110. The local preset data 602 include data about the preset buttons 512 of the PMSA system 110. An example of the local preset data 602 is illustrated and described in further detail herein, such as with reference to FIG. 8.

Still referring to FIG. 7, the media delivery system 112 includes the PMSA server application 250 (as described also in FIG. 3) and cloud preset data 610. The PMSA server application 250 can include the preset-based media delivery engine 126 (as described in FIG. 1), which, in some embodiments, can include a cloud-based preset management engine 612 and a multiple media playback devices management engine 614.

In some embodiments, the cloud-based preset management engine 612 of the preset-based media delivery engine 126 operates to receive the preset signal 604 from the PMSA system 110 and perform one or more functions based on the preset signal 604. In some embodiments, the cloud-based preset management engine 612 operates to determine media content 232 that are associated with a preset button identified by the preset signal 604, and transmit the determined media content 232 to the PMSA system 110 for playback. In some embodiments, the determination of the media content 232 can be performed based at least in part on the cloud preset data 610. Example methods of operating the cloud-based preset management engine 612 are illustrated and described in further detail herein, such as with reference to FIGS. 13 and 14.

In some embodiments, the cloud preset data 610 include data about the preset buttons 512 of the PMSA system 110. An example structure of the cloud preset data 610 is illustrated and described in further detail herein, such as with reference to FIG. 9. The cloud preset data 610 is stored in the media delivery system 112, which is remote from the PMSA system 110. The cloud preset data 610 can be used to perform functions that are associated with the preset buttons 512 of the PMSA system 110, such as determining which media content is assigned to the preset button, streaming the media content for playback, and determining the playback state of the media content.

Further, the cloud preset data 610 can be updated as any information therein has been changed, so that the cloud preset data 610 can keep data about the preset buttons 512 up-to-date. For example, any request or change made to the preset buttons 512 of the PMSA system 110, either locally at the PMSA system 110 or remotely via other computing devices (e.g., the computing devices 118), can be informed to the media delivery system 112 and incorporated into the cloud preset data 610. In some embodiments, an update to the cloud preset data 610 can be performed in real-time to the extent that the media delivery system 112 is connected to the network 116 to receive the update. Alternatively, an update to the cloud preset data 610 can be stored at least temporarily locally at the PMSA system 110 or other computing devices that initiate or cause such an update, when the media delivery system 112 is offline. The locally stored update information can be transmitted to the media delivery system 112 once the media delivery system 112 becomes connected to the network 116.

Referring still to FIG. 7, the multiple media playback devices management engine 614 operates to perform functions requested from one or more other media playback devices 104, such as the computing device 118. Further, the multiple media playback devices management engine 614 can operate to share at least part of the cloud preset data 610 with other media playback devices 104. For example, the multiple media playback devices management engine 614 can use at least part of the cloud preset data 610 to perform functions requested from the other media playback devices 104. An example method of operating the multiple media playback devices management engine 614 is illustrated and described in further detail herein, such as with reference to FIG. 15.

In some embodiments, the multiple media playback devices management engine 614 operates to receive a request signal 620 from a media playback device 104. The request signal 620 can include a request for particular media content for playback. If the requested media content is the media content that is associated with the preset button 512 of the PMSA system 110, the multiple media playback devices management engine 614 can refer to the cloud preset data 610 and obtain information about the preset button 512, such as the playback state of the media content associated with the preset button 512. The multiple media playback devices management engine 614 can transmit the requested media content 622 to the media playback device 104 based on the obtained information about the preset button 512. By way of example, if the media content associated with the preset button 512 has been previously played and stopped at a particular elapsed time, the cloud preset data 610 stores such playback state information. Upon request for the same media content from another media playback device 104, the multiple media playback devices management engine 614 can transmit the media content to the media playback device 104 along with the playback state information so that the media content is played back from the particular elapsed time (i.e., not from the beginning of the media content, but from the position of the media content where the media content has been previously left off).

Figure 8:
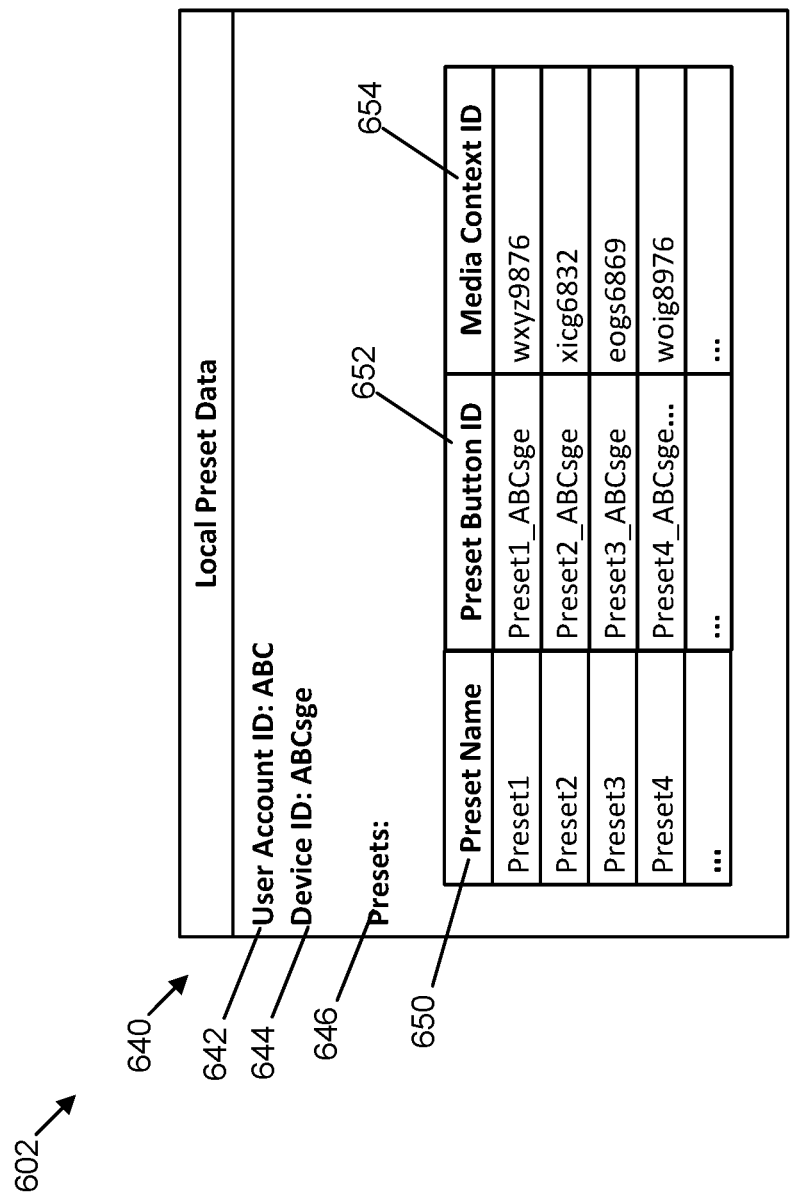
FIG. 8 illustrates an example data structure of local preset data.

FIG. 8 illustrates an example data structure 640 of the local preset data 602. As described above, the local preset data 602 can be stored in the PMSA system 110. In some embodiments, the local preset data 602 include a user account identifier 642, a device identifier 644, and preset button information 646. In other embodiments, the local preset data 602 can include other information, such as playback setting information (e.g., playback mode (shuffle, repeat, normal, etc.), playback speed, sound quality, etc.).

The user account identifier 642 is information that identifies a user account associated with the PMSA system 110. The device identifier 644 is information that identifies the PMSA system 110.

The preset button information 646 includes information about one or more preset buttons 512 of the PMSA system 110. In some embodiments, the preset button information 646 includes a preset name 650, a preset button identifier (ID) 652, and a media context identifier (ID) 654. The preset name 650 is a name of a preset button 512. The preset name 650 can be predetermined with a word or phrase (e.g., "Preset 1," "Preset 2," "Preset 3," and "Preset 4"). In other embodiments, the preset name 650 can be reset or renamed as desired by a user. The preset button identifier 652 is configured to identify an associated preset button 512. The media context identifier 654 is configured to identify a media context that is associated with a corresponding preset button 512. In some embodiments, the preset button identifier 652 and/or the media context identifier 654 are configured as Uniform Resource Identifiers (URIs).

Figure 9:
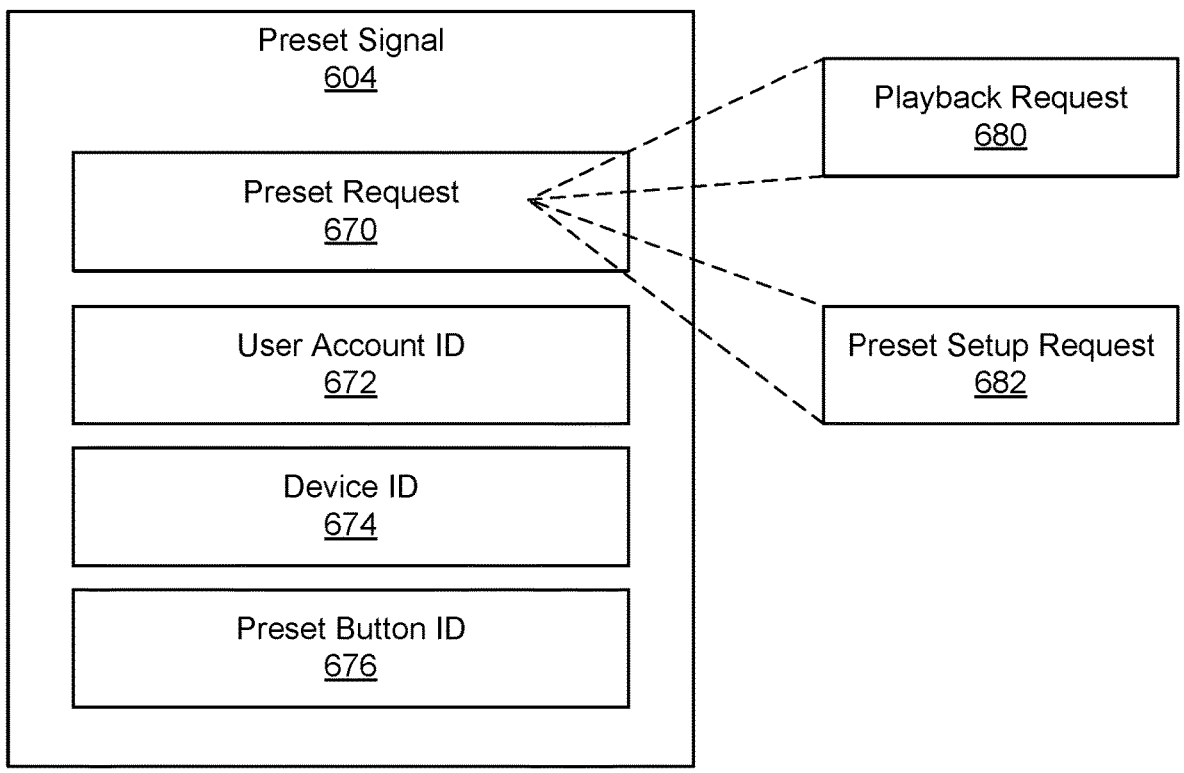
FIG. 9 illustrates an example preset signal.

FIG. 9 illustrates an example of the preset signal 604 of FIG. 7. In some embodiments, the preset signal 604 conveys a preset request 670, a user account identifier 672, a device identifier 674, and a preset button identifier 676.

As described herein, the preset signal 604 is transmitted from the PMSA system 110 to the media delivery system 112. The preset signal 604 includes information that is usable by the media delivery system 112 to perform functions requested via a preset button 512 at the PMSA system 110. In some embodiments, the preset signal 604 is generated based at least in part on the local preset data 602.

The preset request 670 includes a request that is received via a preset button 512 of the PMSA system 110. As described herein, the PMSA system 110 operates to receive a user input (e.g., a pressing action) via the preset button 512 and process the user input to determine the request intended by the user input.

Various requests can be made via the preset button 512 of the PMSA system 110. In some embodiments, the preset request 670 includes a playback request 680 configured to request to play, or stop playing, particular media content (e.g., a media context 238) associated with the preset button 512 via which the user input is received. Example methods of using the playback request 680 are illustrated and described in further detail herein, such as with reference to FIGS. 13 and 14.

Alternatively, the preset request 670 can include a preset setup request 682 configured to request to set up the preset button 512 by assigning another media content (e.g., another media context 238) with the preset button 512. An example method of using the preset setup request 682 is illustrated and described in further detail herein, such as with reference to FIG. 15.

The user account identifier (ID) 672 is information that identifies a user account associated with the PMSA system 110 at which the preset request 670 is received. In some embodiments, the user account identifier 672 is retrieved from the local preset data 602 (e.g., the user account identifier 642).

The device identifier (ID) 674 is information that identifies the PMSA system 110 at which the preset request 670 is received. In some embodiments, the device identifier 674 is retrieved from the local preset data 602 (e.g., the device identifier 644).

The preset button identifier (ID) 676 is information that identifies the preset button 512 of the PMSA system 110 via which the preset request 670 is received. In some embodiments, the preset button identifier 676 is retrieved from the local preset data 602 (e.g., the preset button identifier 652).

In alternative embodiments, the preset signal 604 can further include other information usable by the media delivery system 112. Examples of such other information include a preset name of the selected preset button, a media context identifier associated with the selected preset button, playback setting information, and any other suitable information associated with or stored in the PMSA system 110.

Figure 10:
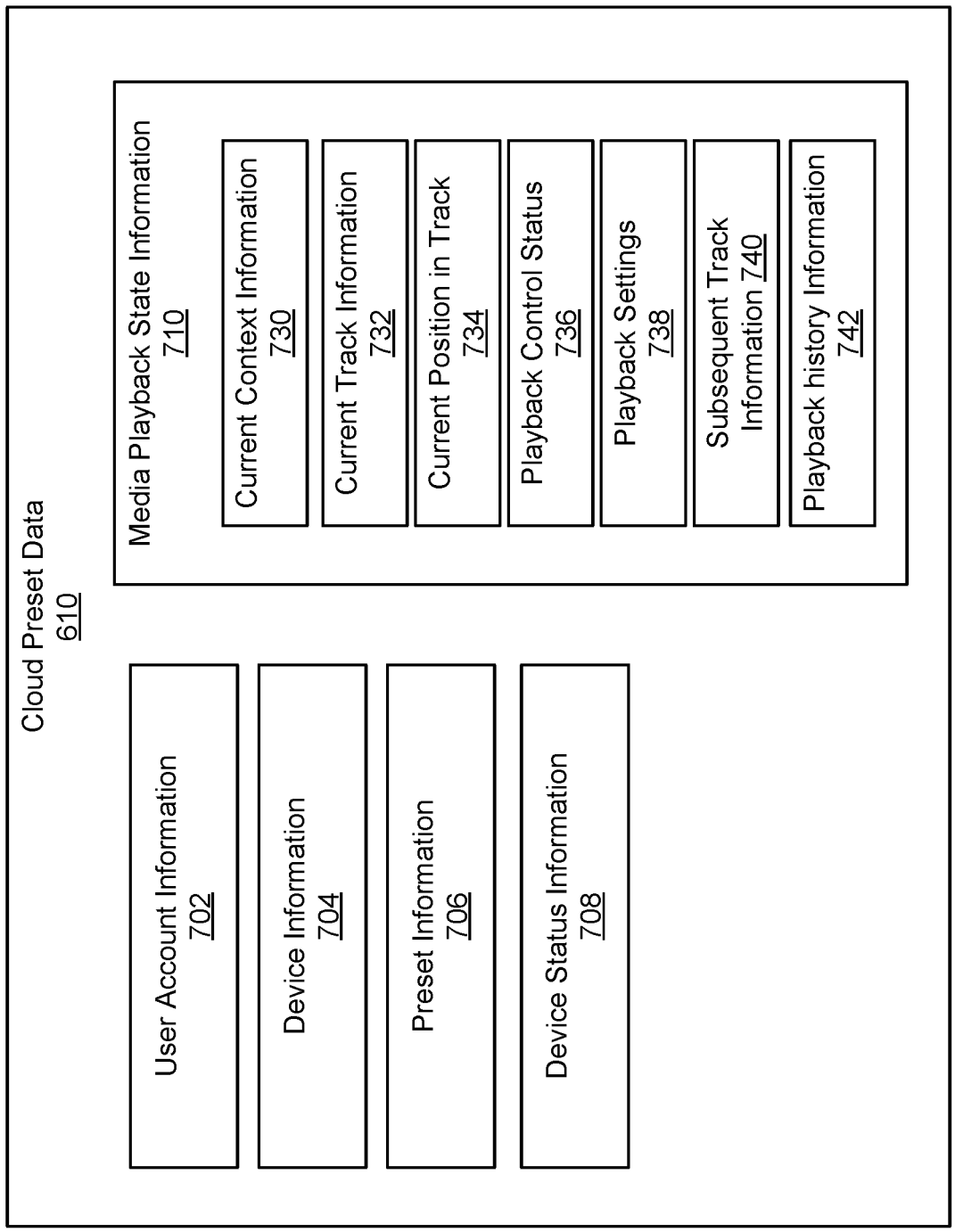
FIG. 10 is a block diagram that illustrates an example cloud preset data.

FIG. 10 is a block diagram that illustrates an example of the cloud preset data 610 of FIG. 7. In some embodiments, the cloud preset data 610 include user account information 702, device information 704, preset information 706, device status information 708, and media playback state information 710.

The cloud preset data 610 include information associated with the preset buttons 512 of the PMSA system 110. In some embodiments, the cloud preset data 610 include information for a plurality of PMSA systems 110 and can be used by the media delivery system 112 to control the plurality of PMSA systems 110. In other embodiments, the cloud preset data 610 can be dedicated to a single PMSA system 110 or a limited group of PMSA systems 110

The user account information 702 includes information that identifies user accounts that are associated with PMSA systems 110, respectively. In some embodiments, the user account information 702 includes user account identifiers for identifying the user accounts that match the respective PMSA systems 110. A user account identifier can be a string of numbers and/or letters that identify a user account. An example of the user account information 702 is illustrated and described in more detail with reference to FIG. 11.

In some embodiments, when the media delivery system 112 receives the preset signal 604, the media delivery system 112 can retrieve the user account information 702 and determine a user account that matches the preset signal 604. For example, the preset signal 604 can include a user account identifier that identifies a user account associated with the PMSA system 110, and the media delivery system 112 can process the preset signal 604 and look up the user account information 702 to determine which user account in the user account information 702 is associated with the PMSA system 110.

The device information 704 includes information that identifies one or more PMSA systems 110. In some embodiments, the device information 704 includes device identifiers for identifying PMSA systems 110. A device identifier can be a string of numbers and/or letters that identify a PMSA system. An example of the device information 704 is illustrated and described in more detail with reference to FIG. 11.

In some embodiments, when the media delivery system 112 receives the preset signal 604, the media delivery system 112 can retrieve the device information 704 and determine a device identifier that matches the preset signal 604. For example, the preset signal 604 can include a device identifier that identifies the PMSA system 110, and the media delivery system 112 can process the preset signal 604 and look up the device information 704 to determine which PMSA system matches the device identifier included in the preset signal 604.

The preset information 706 includes information that identifies one or more preset buttons 512 of PMSA systems 110. In some embodiments, the preset information 706 includes preset identifiers for identifying preset buttons of PMSA systems 110. A preset identifier can be a string of numbers and/or letters that identify a preset button of a PMSA system. An example of the preset information 706 is illustrated and described in more detail with reference to FIG. 11.

In some embodiments, when the media delivery system 112 receives the preset signal 604, the media delivery system 112 can retrieve the preset information 706 and determine a preset button identifier that matches the preset signal 604. For example, the preset signal 604 can include a preset button identifier that identifies a preset button of a PMSA system 110, and the media delivery system 112 can process the preset signal 604 and look up the preset information 706 to determine which preset button matches the preset button identifier included in the preset signal 604.

The device status information 708 includes information about statuses of PMSA systems 110. Each of the PMSA systems 110 can be in either an active state or an inactive state. In some embodiments, when a PMSA system 110 is in an active state, the PMSA system 110 is in operation and accessible by the media delivery system 112 via the network 116. When a PMSA system 110 is in an inactive state, the PMSA system 110 is not in operation and inaccessible by the media delivery system 112 via the network 116.

The media playback state information 710 includes information about media content playback via PMSA systems 110. In some embodiments, the media playback state information 710 is provided for each user account. In other embodiments, the media playback state information 710 is provided for each media playback device. In yet other embodiments, the media playback state information 710 is provided for each media context. In still other embodiments, the media playback state information 710 is provided for each media content item.

In some embodiments, the media playback state information 710 includes current context information 730, current track information 732, current position-in-track information 734, playback control status information 736, playback settings information 738, subsequent track information 740, and playback history information 742.

The current context information 730 includes information about a media context that is being currently played.

The current track information 732 includes information about a media content item (e.g., track) that is currently being played. The currently-playing media content item can be one of the media content items included in the currently-playing media context.

The current position-in-track information 734 includes information about a current playback position of the media context. For example, the current position-in-track information 734 includes a time (e.g., an elapsed time or progress time) that has elapsed since the beginning of playback of the media context. In other embodiments, the current position-in-track information 734 includes a remaining time until the media context is complete to play. In other embodiments, the current position-in-track information 734 can be configured for a particular media content item.

The playback control status information 736 includes information that indicates whether the current media content item is currently being played or stopped (including paused).

The playback settings information 738 includes information about one or more settings of PMSA systems 110. Examples of the settings of PMSA systems 110 include preset information, playback settings, sound quality settings, notification settings, advertisement settings, and other settings for controlling operation of the PMSA systems 110 or media content playback via the PMSA systems 110.

The subsequent track information 740 includes information about a media content item (e.g., track) that is to be played after the current media content item. In some embodiments, the subsequent track information 740 identifies a single media content item. In other embodiments, the subsequent track information 740 identifies a plurality of media content items in order.

The playback history information 742 includes information about the media content items that have been played. In some embodiments, the playback history information 742 can be provided as the playback history by each user account. In other embodiments, the playback history information 742 can be provided as the playback history by each media playback device.

Figure 11:
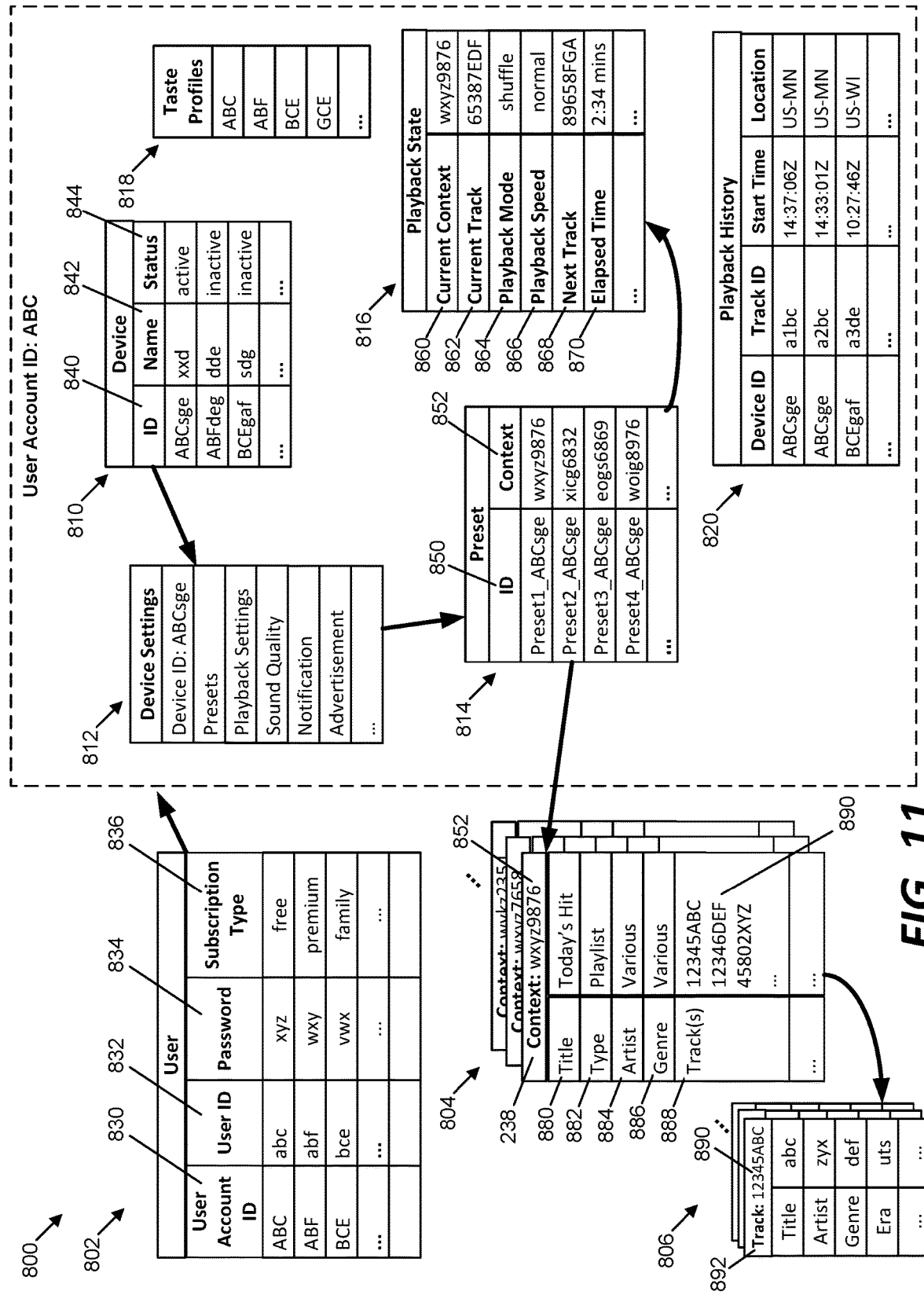
FIG. 11 illustrates an example data structure that may appear in a database of the media delivery system.

FIG. 11 illustrates an example data structure that may appear in a database of the media delivery system 112. In this embodiment, the data in the media delivery system 112 may be represented with a plurality of tables which identifies a rational nature of the database according to the embodiment of the present disclosure. However, in alternative embodiments, the data stored in the media delivery system 112 may also be implemented using other database models.

In the illustrated example, the data structure 800 includes a user account table 802, a media context table 804, and a media content item table 806. For each user account, the data structure 800 includes a device data table 810, a device setting table 812, a preset table 814, a playback state table 816, a taste profile table 818, and a playback history table 820. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used. In addition, the data contained in the set of data structures 800 is stored according to a defined security policy and in accordance with applicable regulations.

The user account table 802 can be configured to include data usable to identify users of the media delivery system 112 (e.g., a media content provider or a media streaming service). In some embodiments, the user account table 802 can be used to store and identify the user accounts 240 as described with reference to FIG. 3. In some embodiments, the user account table 802 can reference one or more other tables, and/or be referenced by one or more other tables. Some embodiments of the user account table 802 can contain a field for user account identifiers (IDs) 830, a field for user identifiers (IDs) 832, a field for passwords 834, and a field for subscription types 836. The user account ID field identifies a plurality of user account IDs 830 associated with the users of the media delivery system 112. The user ID field identifies user IDs 832 associated with the user accounts. The user IDs 832 include names or other identification information that the users can use to identify themselves in the service provided by the media delivery system 112. The user IDs 832 can be set up by the users or automatically assigned to the users. The password field stores data associated with passwords 834 of the users, such as hashed and salted passwords. The subscription type field identifies subscription types 836 associated with the user accounts.

Examples of the subscription types 836 include a free subscription and a fee-based subscription with a single tier or with multiple tiers. Such a fee-based subscription can provide services that the free subscription does not provide.

In other embodiments, the user account table 802 can contain additional fields for other information about user, such as biographical information (e.g., address, contact information, age, gender, birth date/year, family, relationships, work, education, etc.).

Referring still to FIG. 11, each user account that can be identified in the user account table 802 is associated with, and identifies, a set of data for providing various services from the media delivery system 112. In some embodiments, such a set of data includes a device data table 810, a device setting table 812, a preset table 814, a playback state table 816, and a taste profile table 818. In the illustrated example, the tables 810, 812, 814, 816, and 818 are primarily described to be associated with a single user account (e.g., User Account ID: ABC). However, it is understood that, in other embodiments, the tables 810, 812, 814, 816, and 818 can be structured to be associated with a plurality of user accounts The device data table 810 identifies one or more devices associated with a particular user account (e.g., User Account ID: ABC in FIG. 11). In some embodiments, the device data table 810 can be referenced by the user account table 802. Other tables can reference the device data table 810. The device data table 810 can also reference one or more other tables. The device data table 810 can contain a field for device identifiers (IDs) 840, a field for device names 842, and a field for device status 844. The device ID field includes one or more device IDs 840 of one or more media playback devices 104 that are associated with the particular user account.

In some embodiments, a plurality of media playback devices 104, such as the PMSA 110, the mobile computing device 118, and other computing devices, can be respectively used to access media content service from the media delivery system 112 which is associated with a single user account. For example, a user can use different media playback devices 104, such as the PMSA 110 and the mobile computing device 118, to log in to media content service with the user's user account information, and the media content service associated with the user account can be provided to one or more of the media playback devices 104 through which the user has logged in to the user account.

The device name field includes one or more device names 842 associated with the device IDs 840. The device status field identifies a device status 844 for each of the media playback devices 104 identified in the device data table 810. In some embodiments, the device status can be either active or inactive. When the device status of a media playback device 104 is active, the media playback device 104 is in operation and accessible by the media delivery system 112 via the network 116. When the device status of a media playback device 104 is inactive, the media playback device 104 is not in operation and thus inaccessible by the media delivery system 112 via the network 116.

The device setting table 812 includes information about settings that are configurable in one or more particular media playback devices. In some embodiments, the device setting table 812 can be referenced by the device data table 810. Other tables can reference the device setting table 812. The device setting table 812 can reference one or more other tables. In the illustrated example, the device setting table 812 indicates that the media playback device identified by the device ID ("ABCsge") has various settings, such as presets, playback settings, sound quality, notification, advertisement, and other user-configurable settings.

The preset table 814 includes information about presets associated with one or more particular media playback devices 104. In some embodiments, the preset table 814 can be referenced by the device setting table 812. Other tables can also reference the preset table 814. The preset table 814 can reference one or more other tables. In the illustrated example, the preset table 814 contains information about the presets provided in the media playback device identified by the device ID ("ABCsge").

Some embodiments of the preset table 814 include a field for preset identifiers (IDs) 850 and a field for media context identifiers (IDs) 852. The preset ID field contains one or more preset identifiers (IDs) 850 that identify presets provided in the particular media playback device 104. The context ID field contains one or more media context identifiers 852 associated with the preset identifiers 850, respectively. The media context identifiers 852 are used to identify media contexts 238, as described herein. In some embodiments, a media context identifier is configured as a Uniform Resource Identifier (URI).

In the illustrated examples of FIG. 8, the PMSA 110 includes the preset buttons 512, and the preset buttons 512 can be identified by the preset identifiers 850. As the preset identifiers 850 are associated with the media context identifiers 852 that identify media contexts, the preset buttons 512 in the PMSA 110 can be used to retrieve the media contexts identified by the media context identifiers 852.

The playback state table 816 includes information about playback of one or more media contexts 238. In some embodiments, where a plurality of media playback devices 104 may be used to play media content associated with a particular user account, only one of the plurality of media playback devices 104 can be used to play the media content while the other media playback devices 104 may not be used to play the same media content simultaneously. In these embodiments, the playback state table 816 is configured to indicate playback information of the media content that is in common among the plurality of media playback devices associated with the particular user account. In other embodiments, the playback state table 816 is configured to indicate playback information for each of the media playback devices associated with the particular user account, where the media playback devices may be used independently to play media content in different manners.

In some embodiments, the playback state table 816 contains a current context 860, a current media content item (i.e., a current track) 862, a playback mode 864, a playback speed 866, a next media content item (i.e., a next track) 868, and an elapsed playback time 870. In addition or alternatively, the playback state table 816 can contain other playback-related information. In some embodiments, the playback state table 816 can reference one or more other tables, and/or be referenced by one or more other tables. The current context 860 indicates a media context 238 that is being currently played in a media playback device 104. The current media content item 862 indicates a media content item that is being currently played from the current context 860. The playback mode 864 indicates a playback mode that is currently selected. Examples of the playback mode include a normal playback mode, a repeat playback mode, and a shuffle playback mode. The playback speed 866 indicates a playback speed that is currently selected. Examples of the playback speed include a normal playback speed, one or more faster playback speeds, and one or more slower playback speeds. The next media content item 868 indicates a media content item that is in queue and will be subsequently played after the current media content item 862. The elapsed playback time 870 indicates a time that a media content item has progressed for playback (e.g., a playback progress time). In some embodiments, the elapsed playback time 870 can include a remaining playback time which indicates a time that remains until the playback of a media content item is complete.

Referring still to FIG. 11, the taste profile table 818 is configured to identify a taste profile 242 (FIG. 3) associated with the particular user account. In some embodiments, the taste profile table 818 can be referenced by the user account table 802. Other tables can reference the taste profile table 818. The taste profile table 818 can also reference one or more other tables.

The playback history table 820 describes media content items that have been played. In some embodiments, the playback history table 820 indicates the playback history of media content items by each user account. In other embodiments, the playback history table 820 can be configured to provide the playback history of media content items by each media playback device.

The playback history table 820 can reference and be referenced by one or more other tables. In an example, each playback record of the playback history table 820 includes data associated with a media content item played by a respective account or device. Each playback record of the playback history table 820 includes data associated with one or more fields of the playback history table 820, such as a device ID field (e.g., for storing an identifier of the device that caused playback of the playback record), a media content item (e.g., track) ID field (e.g., for storing an identifier of the media content item that was played back), a start time field (e.g., for identifying the start time at which the media content item was played back), and a location field (e.g., for identifying the location of the device associated with the device ID when playback was initiated).

With reference still to FIG. 11, the media context table 804 is configured to identify one or more media contexts 238 as described with reference to FIG. 3. As illustrated, some embodiments of the media context table 804 can respectively identify a media context 238 by a media context identifier 852. The media context table 804 contains various pieces of information about a corresponding media context 238. Examples of such information include a media context title 880, a media context type 882, a media context artist 884, a media context genre 886, and a list of media content items 888 associated with the media context 238. Other information can also be included in the media context table 804.

The media context title 880 indicates a title of the media context 238. The media context type 882 indicates a type of the media context 238, such as a playlist, an album, an artist, and a track. The media context artist 884 indicates one or more artists associated with the media context 238. The media context genre 886 indicates a genre associated with the media context 238. The list of media content items 888 indicates one or more media content items (i.e., tracks) associated with the media context 238. Each of the media content items can be identified by a track identifier 890. In some embodiments, one or more of the media content items 234, as described with reference to FIG. 3, are identified by the list of media content items 888.

The media content item table 806 is configured to identify one or more media content items (i.e., tracks) 892 by the track identifiers 890. In some embodiments, a track identifier is configured as a Uniform Resource Identifier (URI). In some embodiments, one or more of the media content items 892 are selected from the media content items 234 as described with reference to FIG. 3. The media content item table 806 can further include various attributes about the media content item 892, such as a media content item title, artist identification (e.g., individual artist name or group name, or multiple artist names or group names), genre, era, and other attributes of the media content item.

Figure 12:
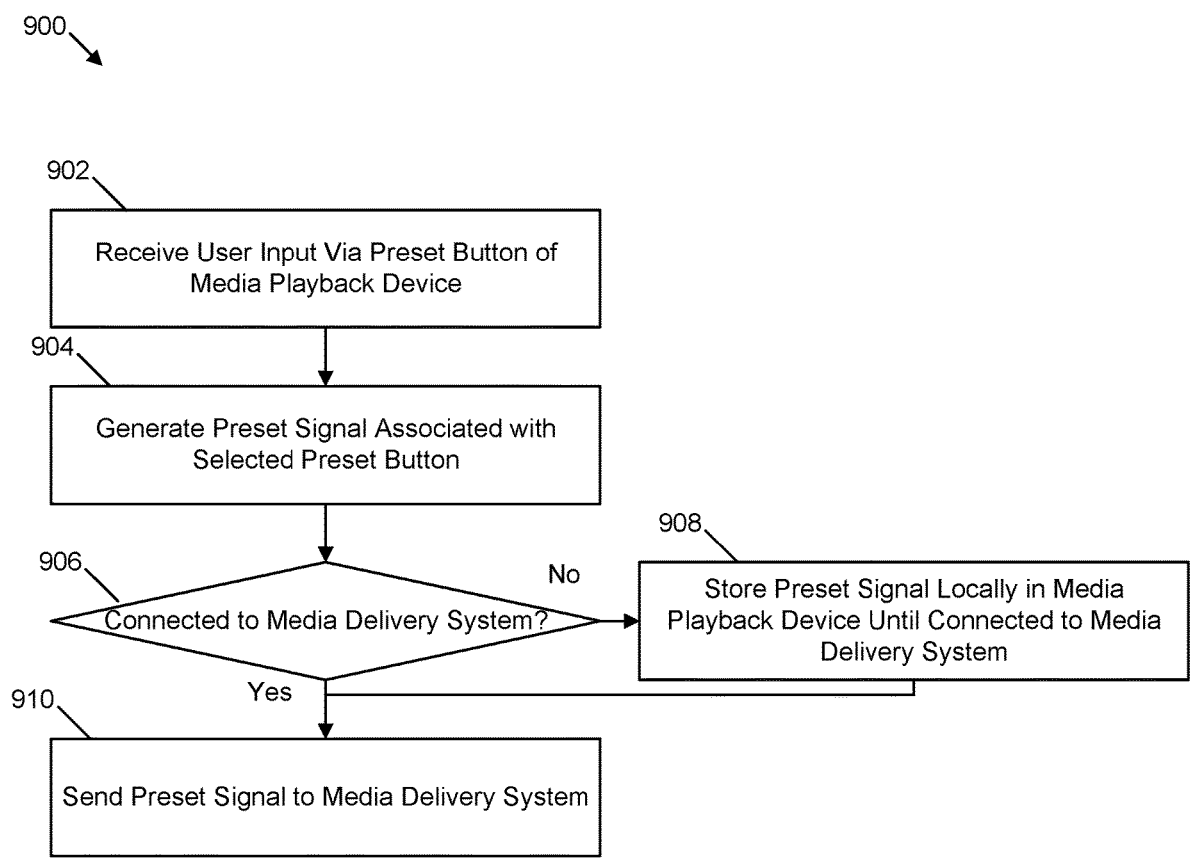
FIG. 12 is a flowchart of an example method for operating the PMSA system.

FIG. 12 is a flowchart of an example method 900 for operating the PMSA system 110. In some embodiments, the method 900 is performed at least partially by the preset input processing engine 184 of the PMSA system 110.

At operation 902, the PMSA system 110 operates to receive a user input via a preset button 512 of the PMSA system 110. As described herein, in some embodiments, the preset button 512 is configured to be physically depressible to be actuated. A user input can be a user's pressing action against the preset button 512, which causes the preset button 512 to be depressed. The PMSA system 110 can include a sensor system that detects the depression of the preset button 512 and generate a signal representative of the user input. In some embodiments, the sensor system can detect different types of pressing action (e.g., a single pressing, a series of multiple pressings, a combination of pressing and holding, etc.) against the preset button 512 and identify different user inputs corresponding to such different pressing action types.

At operation 904, the PMSA system 110 operates to generate a preset signal 604 associated with the selected preset button 512. As described herein, the preset signal 604 is configured to include a request intended by the user input via the preset button 512. Further, the preset signal 604 includes at least one of a user account identifier 672 and a device identifier 674. The user account identifier 672 is configured to identify a user account associated with the PMSA system 110. The device identifier 674 is configured to identify the PMSA system 110. In addition, the preset signal 604 can include a preset button identifier 676 that identifies the selected preset button 512 of the PMSA system 110.

At operation 906, the PMSA system 110 operates to determine whether the PMSA system 110 is online and thus in data communication with the media delivery system 112 via the network 116. If it is determined that the PMSA system 110 is in data communication with the media delivery system 112 ("Yes" at this operation), the method 900 moves directly to operation 910. Otherwise ("No" at this operation), the method 900 moves to operation 908.

At operation 908, the PMSA system 110 operates to store the preset signal 604 locally in the PMSA system 110. In some embodiments, the preset signal 604 can be stored at least until the PMSA system 110 becomes in data communication with the media delivery system 112. As described with reference to operation 910, the preset signal 604 can be transmitted to the media delivery system 112 once the PMSA system 110 becomes in data communication with the media delivery system 112. In some embodiments, the preset signal 604 is temporarily stored in the PMSA system 110 and removed once it is sent to the media delivery system 112.

Alternatively, the preset signal 604 can be generated at the operation 904 only if it is determined that the PMSA system 110 is in data communication with the media delivery system 112. Then, the preset signal 604 can be transmitted to the media delivery system 112 once the preset signal 604 is generated, without performing the operation 906.

At operation 910, the PMSA system 110 operates to send the preset signal 604 to the media delivery system 112 via a network (e.g., the network 116). As described herein, the media delivery system 112 operates to perform one or more functions using the preset signal 604.

Figure 13:
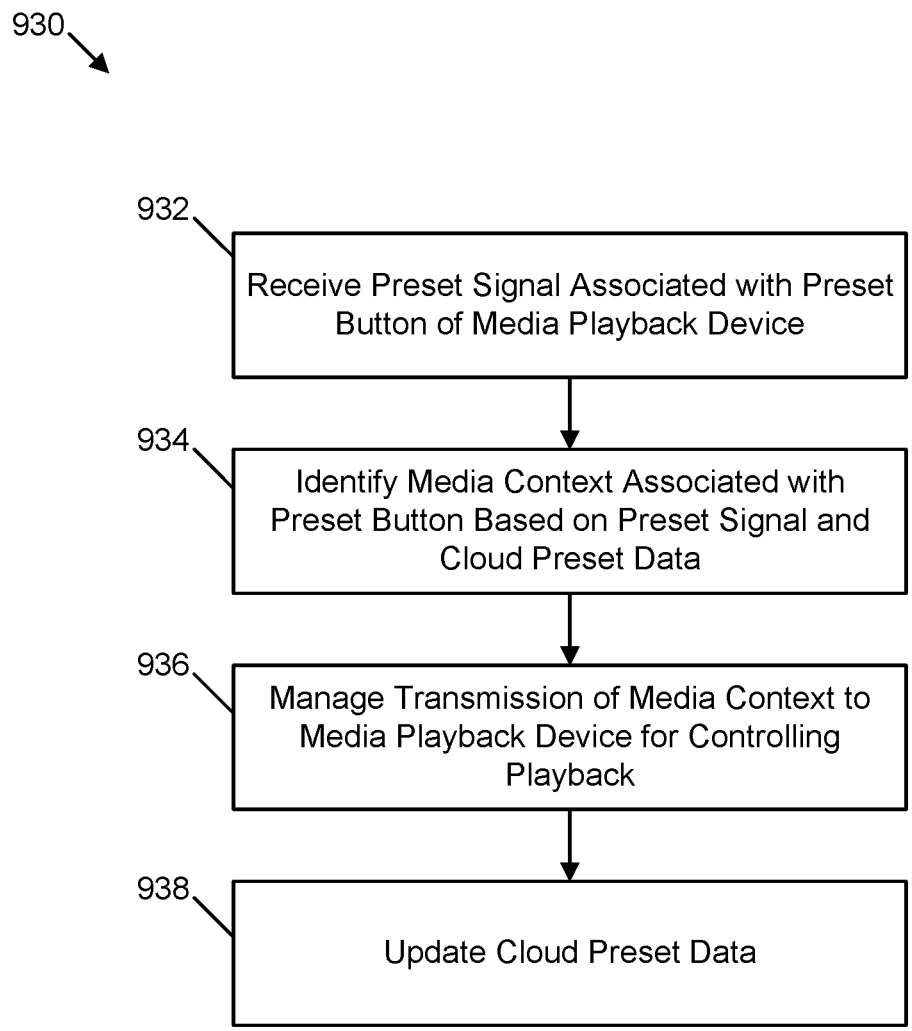
FIG. 13 is a flowchart of an example method for operating the media delivery system.

FIG. 13 is a flowchart of an example method 930 for operating the media delivery system 112. In some embodiments, the method 930 is performed at least partially by the preset-based media delivery engine 126 (e.g., the cloud-based preset management engine 612 thereof) of the media delivery system 112. In some embodiments, the method 930 is configured to process the playback request 680 included in the preset signal 604. As described herein, the playback request 680 describes a request for starting or stopping playback of media content (e.g., a media context 238) associated with the preset button 512 of a media playback device 104. In some embodiments, the media playback device 104 can be the PMSA system 110 as described herein. In other embodiments, any other computing device, such as the computing device 118, can be the media playback device 104 to the extent that the other computing device has one or more preset buttons 512.

At operation 932, the media delivery system 112 receives the preset signal 604 associated with the preset button 512 of a media playback device 104, such as the PMSA system 110. The preset signal 604 can be generated as the preset button 512 is actuated by a manual input against the preset button 512. In some embodiments, the preset signal 604 includes the playback request 680, at least one of the user account identifier 672 and the device identifier 674, and the preset button identifier 676, as illustrated in FIG. 9.

At operation 934, the media delivery system 112 identifies a media context 238 associated with the preset button 512 based on the received preset signal 604 and the cloud preset data 610. In some embodiments, the media delivery system 112 determines the media context 238 by referring to the cloud preset data 610 and identifying the media context 238 that is associated with the information that matches the information included in the preset signal 604. Such matching information can include at least one of the user account identifier, the device identifier, and the preset button identifier. For example, the media delivery system 112 operates to look up the user account information 702 in the cloud preset data 610 to identify a user account identifier that matches the user account identifier 672 included in the preset signal 604. In addition or alternatively, the media delivery system 112 operates to look up the device information 704 in the cloud preset data 610 to identify a device identifier that matches the device identifier 674 included in the preset signal 604. Further, the media delivery system 112 operates to look up the preset information 706 in the cloud preset data 610 to identify a preset button identifier that matches the preset button identifier 676 included in the preset signal 604. The media delivery system 112 can then determine a media context identifier 852 for identifying the media context 238 that is associated with at least one of the user account identifier and the device identifier, and that is associated with the preset button identifier in the cloud preset data 610.

At operation 936, the media delivery system 112 manages transmission of the identified media context 238 to the media playback device 104 for controlling playback of the media context 238. In embodiments where the playback request 680 included in the preset signal 604 is a request for starting playback, the media delivery system 112 can transmit the media context 238 to the media playback device 104 so that the media playback device 104 can start playing the media context 238. In other embodiments where the playback request 680 is a request for stopping playback, the media delivery system 112 can stop transmitting the media context 238 to the media playback device 104 while the media playback device 104 stops playing the media context 238. Alternatively, for the playback stop request, the media delivery system 112 continue to transmit the media context 238 to the media playback device 104 for at least a predetermined period of time while the media playback device 104 has stopped the playback of the media context 238.

At operation 938, the media delivery system 112 operates to update the cloud preset data 610. In some embodiments, the media playback state information 710 in the cloud preset data 610 is updated to reflect any change to the playback of the media context 238. For example, where the media context 238 starts playing back, the media playback state information 710 is updated to indicate, for example, the media context 238 as the current context, which media content item in the media context 238 is being played, and the playback time (e.g., the elapsed time) of the currently-playing media content item in the media context 238. Where the playback of the media context 238 is stopped, the media playback state information 710 is updated with the fact that the playback of the media context 238 is stopped, and with the indication of the time (e.g., the elapsed time) when the media content item of the media context 238 is stopped. Other information associated with the playback of the media context can be also updated in the media playback state information 710.

As described herein, the updated cloud preset data 610 can be used for playback or setup of the media context 238 using the same media playback device 104 (e.g., the PMSA system 110) or other media playback devices 104 (e.g., the computing devices 118) associated with the same user account. For example, when the same media playback device 104 receives a user input via the same preset button 512, the media playback device 104 generates and transmits a preset signal 604 to the media delivery system 112, and the media delivery system 112 can perform the method 930 or method 950 (FIG. 14) according to the preset signal 604, depending on a request identified in the preset signal 604.

Figure 14:
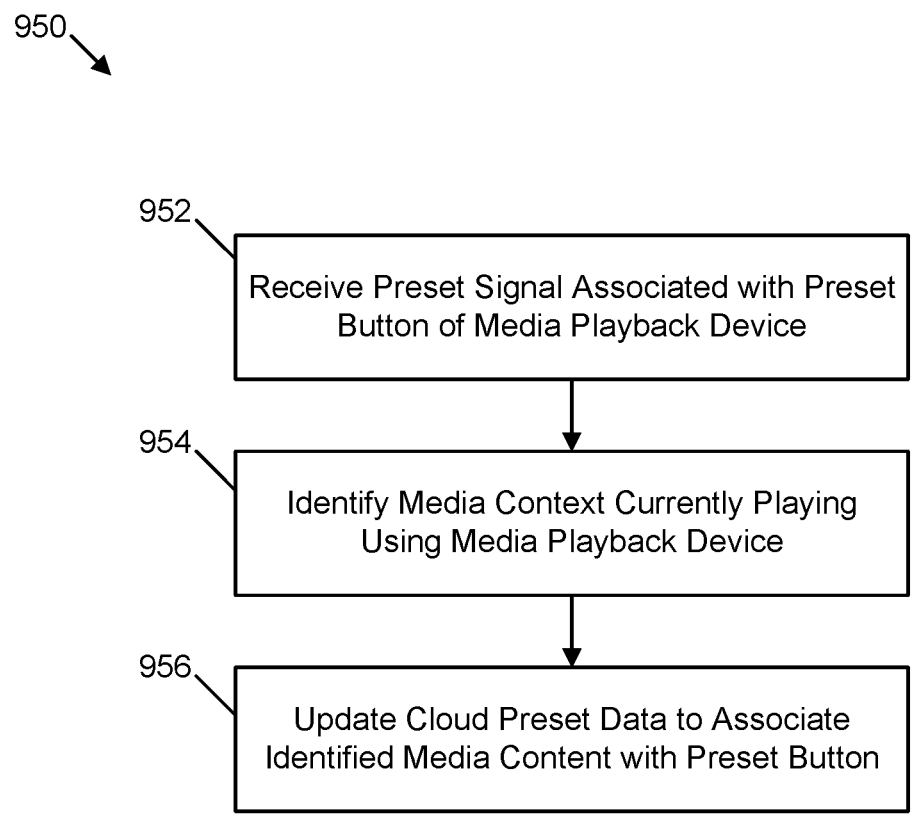
FIG. 14 is a flowchart of another example method for operating the media delivery system.

FIG. 14 is a flowchart of an example method 950 for operating the media delivery system 112. In some embodiments, the method 950 is performed at least partially by the preset-based media delivery engine 126 (e.g., the cloud-based preset management engine 612 thereof) of the media delivery system 112. In some embodiments, the method 950 is configured to process the preset set up request 682 included in the preset signal 604. As described herein, the preset setup request 682 describes a request for setting up the selected preset button 512 of a media playback device 104 by assigning media content (e.g., a media context 238) to the preset button 512. In some embodiments, the media playback device 104 can be the PMSA system 110 as described herein. In other embodiments, any other computing device, such as the computing device 118, can be the media playback device 104 to the extent that the other computing device has one or more preset buttons 512.

At operation 952, the media delivery system 112 receives the preset signal 604 associated with a preset button 512 of a media playback device 104, such as the PMSA system 110.

In some embodiments, when a particular media context 238 is being played using the media playback device 104, a user (e.g., a listener) can set up the preset button 512 with the currently-playing media context 238. By way of example, while listening to the media context 238, the user can press and hold the preset button 512 for a predetermined period of time (e.g., a few seconds) to assign the media context 238 to the preset button 512. The preset signal 604 can be generated as the preset button 512 is actuated by the pressing and holding action against the preset button 512. Other types of manual inputs can be used to actuate the preset button 512 for this function. In some embodiments, the preset signal 604 includes the preset setup request 682, at least one of the user account identifier 672 and the device identifier 674, and the preset button identifier 676, as illustrated in FIG. 9.

At operation 954, the media delivery system 112 identifies the media context 238 that is being currently played via the media playback device 104. The media delivery system 112 can determine the media context 238 based on the received preset signal 604 and the cloud preset data 610. In some embodiments, the media delivery system 112 determines the media context 238 by referring to the cloud preset data 610 and identifying the media context 238 that is associated with the information that matches the information included in the preset signal 604. Such matching information can include at least one of the user account identifier and the device identifier. For example, the media delivery system 112 operates to look up the user account information 702 in the cloud preset data 610 to identify a user account identifier that matches the user account identifier 672 included in the preset signal 604. In addition or alternatively, the media delivery system 112 operates to look up the device information 704 in the cloud preset data 610 to identify a device identifier that matches the device identifier 674 included in the preset signal 604. The media delivery system 112 can retrieve the media playback state information 710 that is associated with the user account identifier and/or the device identifier, and identify the current context information 730 to determine the media context that is currently being played at the media playback device 104.

At operation 956, the media delivery system 112 operates to update the cloud preset data 610 to associate the identified media context 238 with the preset button 512 of the media playback device 104. For example, the media delivery system 112 can modify the preset information 706 of the cloud preset data 610 so that the currently-playing media context 238 is associated with the preset button 512 of the media playback device 104.

As described herein, the updated cloud preset data 610 can be used for playback or setup of the media context 238 using the same media playback device 104 (e.g., the PMSA system 110) or other media playback devices 104 (e.g., the computing devices 118) associated with the same user account. For example, when the same media playback device 104 receives a user input via the same preset button 512, the media playback device 104 generates and transmit a preset signal 604 to the media delivery system 112, and the media delivery system 112 can perform the method 930 or the method 950 according to the preset signal 604, depending on a request identified in the preset signal 604.

Figure 15:
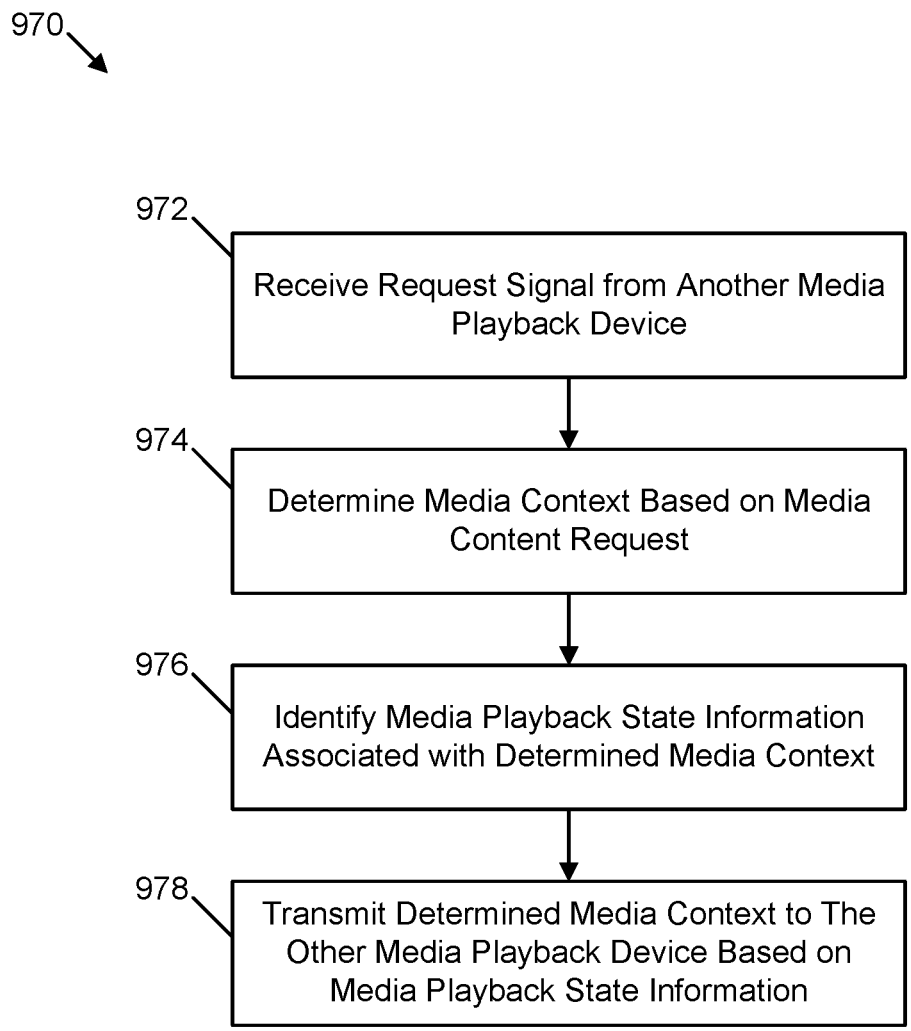
FIG. 15 is a flowchart of yet another example method for operating the media delivery system.

FIG. 15 is a flowchart of an example method 970 for operating the media delivery system 112. In some embodiments, the method 970 is performed at least partially by the preset-based media delivery engine 126 (e.g., the multiple media playback devices management engine 614 thereof) of the media delivery system 112.

In some embodiments, the method 970 is configured to process the request signal 620 from a media playback device 104. As described herein, the request signal 620 describes a request for controlling playback of a particular media context (e.g., start or stop playing the media context), as illustrated in FIG. 7. As described herein, if the media context retrieved by the request signal 620 from a first media playback device 104 (e.g., the computing device 118) is identical to the media context associated with a preset button 512 of a second media playback device 104 (e.g., the PMSA system 110) that is logged in with the same user account as the first media playback device 104, the media playback state information 710 associated with the second media playback device 104 is shared with the first media playback device 104, and, therefore, the media context is transmitted to the first media playback device 104 based on the media playback state information 710. In some embodiments, this is possible because the media playback state information 710 is associated with the user account of the first and second media playback devices 104. In some embodiments, the first media playback device 104 can be the computing device 118 and the second media playback device 104 can be the PMSA system 110 as described herein. Alternatively, the first media playback device 104 can be the PMSA system 110 and the second media playback device 104 can be the computing device 118 to the extent that the computing device 118 has one or more preset buttons 512 as described herein.

At operation 972, the media delivery system 112 receives the request signal 620 (e.g., a media content request) from another media playback device 104, such as the computing device 118. In some embodiments, the request signal 620 is a request for playing a particular media context 238. In other embodiments, the request signal 620 is a request for stopping playback of a particular media context 238 while the media context 238 is currently being played. In yet other embodiments, the request signal 620 can be a request for controlling other aspects, features, or settings associated with playback of a particular media context 238.

In some embodiments, the request signal 620 is generated based on a user input received via the user interface 420 of the computing device 118. The request signal 620 can include at least one of a user account identifier for identifying a user account associated with the computing device 118 and a device identifier for identifying the computing device 118. In addition, the request signal 620 can include a media context identifier for identifying the media context 238 intended by the user input via the computing device 118.

At operation 974, the media delivery system 112 determines the media context 238 identified by the request signal 620. In some embodiments, the media delivery system 112 determines the media context that matches the media content identifier included in the request signal 620.

At operation 976, the media delivery system 112 identifies the media playback state information 710 associated with the determined media context 238. In some embodiments, the media playback state information 710 can be identified based on the user account associated with the other media playback device 104 that has sent the request signal 620 to the media delivery system 112. The request signal 620 can include the user account identifier that identifies the user account associated with the other media playback device 104. The media delivery system 112 can retrieve the cloud preset data 610 associated with the user account and determine the media playback state information 710 in the cloud preset data 610 that is associated with the media context 238.

At operation 978, the media delivery system 112 operates to transmit the media context 238 to the other media playback device 104 based on the media playback state information 710. In some embodiments, the media context 238 is transmitted to the other media playback device 104 according to the playback state, such as the elapsed playback time 870, so that the other media playback device 104 plays the media context 238 from the elapsed playback time 870 rather than the beginning of the media context 238.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for playing media content, the method comprising:
receiving, at a server computing device, a first preset signal from a first media playback device, the first preset signal including a playback request and a first preset button identifier associated with a preset button of the first media playback device, wherein the server computing device stores the first preset button identifier and an associated media content identifier;
upon receiving the first preset signal including the playback request and the first preset button identifier at the server computing device, looking up media content associated with the preset button based on the first preset button identifier;
transmitting the media content to the first media playback device for playback; and
storing, at the server computing device, media playback state information associated with the media content.

2. The method of claim 1, wherein the media playback state information includes current position-in-track information that indicates a current playback position of the media content.

3. The method of claim 1, wherein the media playback state information includes at least one of current media content information, current track information, playback control status, playback settings, subsequent track information, and playback history information.

4. The method of claim 1, further comprising:
storing cloud preset data, the cloud preset data including the media playback state information.

5. The method of claim 1, wherein the preset button is a mechanical button provided in the first media playback device.

6. The method of claim 1, wherein the first preset signal includes at least one of a user account identifier and a device identifier, the user account identifier identifying a user account associated with the first media playback device, and the device identifier identifying the first media playback device.

7. The method of claim 1, wherein the media content includes at least one of an album, a playlist, and a media content item.

8. The method of claim 1, further comprising:
receiving a second preset signal from the preset button of the first media playback device; and
updating the media playback state information associated with the media content in response to the second preset button identifier.

9. The method of claim 8, wherein the first preset signal includes a request for playing the media content, and the second preset signal includes a request for stopping playback of the media content.

10. The method according to claim 1, further comprising:
receiving a request for the media content from a second media playback device;
identifying the media playback state information associated with the media content; and
transmitting the media content to the second media playback device based on the media playback state information.

11. A media delivery system for providing media content to a media playback device, the media delivery system comprising:
at least one processing device;
at least one data storage device storing:
cloud preset data including information about a preset button of the media playback device and a media content associated with the preset button; and
data instructions executable by the at least one processing device to cause the media delivery system to:
receive a first preset signal from the media playback device, the first preset signal including a playback request and a first preset button identifier associated with the preset button of the media playback device, wherein the media delivery system stores the first preset button identifier and an associated media content identifier;
upon receiving the first preset signal including the playback request and the first preset button identifier, look up the media content associated with the preset button based on the first preset button identifier;
transmit the media content to the media playback device for playback; and
update the cloud preset data based on the transmission of the media content.

12. The media delivery system of claim 11, wherein the cloud preset data include media playback state information about the media content.

13. The media delivery system of claim 11, wherein the data instructions further cause the media delivery system to:
receive a second preset signal from the media playback device, the second preset signal associated with the preset button of the media playback device; and
update the cloud preset data in response to the second preset signal.

14. The media delivery system of claim 13, wherein the second preset signal includes a request for stopping playback of the media content.

15. The media delivery system of claim 11, wherein the data instructions further cause the media delivery system to:
receive a request for the media content from another media playback device;
identify the cloud preset data associated with the media content; and
transmit the media content to the other media playback device based on the cloud preset data.

* * * * *